US010529219B2

(12) United States Patent
Herdt et al.

(10) Patent No.: US 10,529,219 B2
(45) Date of Patent: Jan. 7, 2020

(54) HAND HYGIENE COMPLIANCE MONITORING

(71) Applicant: Ecolab USA Inc., St. Paul, MN (US)

(72) Inventors: Brandon L. Herdt, Hastings, MN (US); Daniel R. Wald, Burnsville, MN (US); Kyle D. Wood, Rosemount, MN (US)

(73) Assignee: Ecolab USA Inc., St. Paul, MN (US)

(*) Notice: Subject to any disclaimer, the term of this patent is extended or adjusted under 35 U.S.C. 154(b) by 0 days.

(21) Appl. No.: 16/185,499

(22) Filed: Nov. 9, 2018

(65) Prior Publication Data
US 2019/0147731 A1    May 16, 2019

Related U.S. Application Data

(60) Provisional application No. 62/584,301, filed on Nov. 10, 2017.

(51) Int. Cl.
*A47K 5/12* (2006.01)
*G08B 21/24* (2006.01)
*G09B 19/00* (2006.01)

(52) U.S. Cl.
CPC .......... *G08B 21/245* (2013.01); *A47K 5/1217* (2013.01); *A47K 5/1211* (2013.01); *G09B 19/0076* (2013.01)

(58) Field of Classification Search
CPC .. G08B 21/245; A47K 5/1217; A47K 5/1211; G09B 19/0076

(Continued)

(56) References Cited

U.S. PATENT DOCUMENTS 33,861 A     12/1861 Whitney
1,643,828 A   9/1927 Young
(Continued)

FOREIGN PATENT DOCUMENTS

AU    200114943 B2   5/2001
AU    2012360763 A1  7/2013
(Continued)

OTHER PUBLICATIONS

"3M and Patient Care Technology Systems Collaborate on State of-the-Art Automated Hand Hygiene Solution to Improve Compliance," retrieved from http://news.3m.com/pt/press-release/company/3m-and-patient-care-technology, on Apr. 13, 2017, 2 pp.
(Continued)

*Primary Examiner* — Daryl C Pope
(74) *Attorney, Agent, or Firm* — Shumaker & Sieffert, P.A.

(57) ABSTRACT

A system and associated processes monitor hand hygiene compliance. For example, the hand hygiene compliance system may monitor, analyze and report on hand hygiene compliance after usage of bathroom facilities. Usage of bathroom facilities is determined by sensing activation (e.g., flushing) of a toilet or a urinal. Each activation event gives rise to a hand hygiene opportunity, and should be followed by performance of a corresponding hand hygiene procedure in order for the hand hygiene opportunity to be deemed "compliant". Performance of a hand hygiene procedure is determined by sensing actuation of a hand hygiene product dispenser. To determine whether a hand hygiene opportunity is compliant, the system may determine whether a dispenser actuation event occurred within a predetermined period of time from the activation event.

26 Claims, 9 Drawing Sheets

(58) Field of Classification Search
USPC ........ 340/539.1, 539.16, 539.22, 540, 573.1,
340/603, 604, 3.1
See application file for complete search history.

(56) References Cited

U.S. PATENT DOCUMENTS

| | | |
|---|---|---|
| 1,985,615 A | 12/1934 | Mitchell |
| 2,219,597 A | 10/1940 | Lutz |
| 2,319,739 A | 5/1943 | Kessler |
| 2,333,791 A | 11/1943 | Hutchinson |
| 3,091,327 A | 5/1963 | Lalley |
| 3,136,157 A | 6/1964 | Seed et al. |
| 3,412,254 A | 11/1968 | Meyer-Doering et al. |
| 3,526,334 A | 9/1970 | Ashton et al. |
| 3,578,094 A | 5/1971 | Henry et al. |
| 3,653,544 A | 4/1972 | Young et al. |
| 3,736,584 A | 5/1973 | Hackett et al. |
| 3,743,598 A | 7/1973 | Field |
| 3,754,871 A | 8/1973 | Hessel et al. |
| 3,760,166 A | 9/1973 | Adams et al. |
| 3,761,909 A | 9/1973 | Schweitzer et al. |
| 3,772,193 A | 11/1973 | Nelli et al. |
| 3,774,056 A | 11/1973 | Sample et al. |
| 3,786,467 A | 1/1974 | Cotter |
| 3,796,349 A | 3/1974 | Weber |
| 3,801,977 A | 4/1974 | Cotter |
| 3,826,113 A | 7/1974 | Boraas et al. |
| 3,826,408 A | 7/1974 | Berndt et al. |
| 3,866,198 A | 2/1975 | Cohen |
| 3,961,321 A | 6/1976 | Moss |
| 3,986,182 A | 10/1976 | Hackett |
| 4,040,515 A | 8/1977 | Hessel et al. |
| 4,046,996 A | 9/1977 | Williams et al. |
| 4,076,146 A | 2/1978 | Lausberg et al. |
| 4,117,462 A | 9/1978 | Miller |
| 4,083,298 A | 11/1978 | Schotten |
| 4,198,618 A | 4/1980 | Kleinschmidt |
| 4,199,001 A | 4/1980 | Kratz |
| 4,209,776 A | 6/1980 | Frederick |
| 4,211,517 A | 7/1980 | Schmid |
| 4,241,400 A | 12/1980 | Keifer |
| 4,247,396 A | 1/1981 | Buseing |
| 4,265,266 A | 5/1981 | Kierbow et al. |
| 4,275,390 A | 6/1981 | Heywang et al. |
| 4,319,349 A | 3/1982 | Hackett |
| 4,353,482 A | 10/1982 | Tomlinson et al. |
| 4,360,905 A | 11/1982 | Hackett |
| 4,373,418 A | 2/1983 | Rhodes et al. |
| 4,380,726 A | 4/1983 | Sado et al. |
| 4,396,828 A | 8/1983 | Dino et al. |
| 4,402,426 A | 9/1983 | Faulkner et al. |
| 4,404,639 A | 9/1983 | McGuire et al. |
| 4,463,844 A | 8/1984 | Huffman et al. |
| 4,482,785 A | 11/1984 | Finnegan et al. |
| 4,486,910 A | 12/1984 | Saalmann et al. |
| 4,509,543 A | 4/1985 | Livingston et al. |
| 4,539,846 A | 9/1985 | Grossman |
| 4,573,606 A | 3/1986 | Lewis et al. |
| 4,590,460 A | 5/1986 | Abbott et al. |
| 4,597,091 A | 6/1986 | Blake |
| 4,606,085 A | 8/1986 | Davies |
| 4,630,654 A | 12/1986 | Kennedy, Jr. |
| 4,644,509 A | 2/1987 | Kiewit et al. |
| 4,676,399 A | 6/1987 | Burckhardt |
| 4,688,585 A | 8/1987 | Vetter |
| 4,690,305 A | 9/1987 | Copeland |
| 4,697,243 A | 9/1987 | Moore et al. |
| 4,707,848 A | 11/1987 | Durston et al. |
| 4,711,370 A | 12/1987 | Goudy, Jr. et al. |
| 4,727,522 A | 2/1988 | Steiner et al. |
| 4,729,120 A | 3/1988 | Steiner et al. |
| 4,733,971 A | 3/1988 | Pratt |
| 4,756,321 A | 7/1988 | Livingston et al. |
| 4,766,548 A | 8/1988 | Cedrone et al. |
| 4,770,859 A | 9/1988 | Heiser, Jr. |
| 4,826,661 A | 5/1989 | Copeland et al. |
| 4,834,546 A | 5/1989 | Putz |
| 4,837,811 A | 6/1989 | Butler et al. |
| 4,839,597 A | 6/1989 | Rowland |
| 4,843,579 A | 6/1989 | Andrews et al. |
| 4,845,965 A | 7/1989 | Copeland et al. |
| 4,848,381 A | 7/1989 | Livingston et al. |
| 4,858,449 A | 8/1989 | Lehn |
| 4,867,196 A | 9/1989 | Zetena et al. |
| 4,867,343 A | 9/1989 | Ricciardi et al. |
| 4,896,144 A | 1/1990 | Bogstad |
| 4,908,190 A | 3/1990 | Maglio et al. |
| 4,938,240 A | 7/1990 | Lakhan et al. |
| 4,944,428 A | 7/1990 | Gmuer et al. |
| 4,964,185 A | 10/1990 | Lehn |
| 4,969,011 A | 11/1990 | Faull et al. |
| 4,974,646 A | 12/1990 | Martin et al. |
| 4,976,137 A | 12/1990 | Decker et al. |
| 4,980,292 A | 12/1990 | Elbert et al. |
| 4,987,402 A | 1/1991 | Nykerk |
| 4,991,146 A | 2/1991 | Ransdell et al. |
| 4,999,124 A | 3/1991 | Copeland |
| 5,006,995 A | 4/1991 | Toschi et al. |
| 5,014,211 A | 5/1991 | Turner et al. |
| 5,014,877 A | 5/1991 | Roos |
| 5,024,352 A | 6/1991 | Gmür et al. |
| 5,036,479 A | 7/1991 | Prednis et al. |
| 5,038,807 A | 8/1991 | Bailey et al. |
| 5,038,973 A | 8/1991 | Gmuer |
| 5,040,699 A | 8/1991 | Gangemi |
| 5,043,860 A | 8/1991 | Koether et al. |
| 5,053,206 A | 10/1991 | Maglio et al. |
| 5,064,094 A | 11/1991 | Roos et al. |
| 5,083,298 A | 1/1992 | Citterio et al. |
| 5,110,364 A | 5/1992 | Mazur et al. |
| 5,115,842 A | 5/1992 | Crafts et al. |
| 5,136,281 A | 8/1992 | Bonaquist |
| 5,147,615 A | 9/1992 | Bird et al. |
| 5,150,099 A | 9/1992 | Lienau |
| 5,153,520 A | 10/1992 | Dumbeck |
| 5,158,895 A | 10/1992 | Ashihara et al. |
| 5,199,118 A | 4/1993 | Cole et al. |
| 5,202,666 A | 4/1993 | Knippscheer |
| 5,203,366 A | 4/1993 | Czeck et al. |
| 5,219,224 A | 6/1993 | Pratt |
| 5,222,027 A | 6/1993 | Williams et al. |
| 5,240,326 A | 8/1993 | Evanson |
| 5,245,317 A | 9/1993 | Chidley et al. |
| 5,263,006 A | 11/1993 | Hermesmeyer |
| 5,268,153 A | 12/1993 | Muller |
| 5,279,448 A | 1/1994 | Hanlin et al. |
| 5,283,639 A | 2/1994 | Esch et al. |
| 5,294,022 A | 3/1994 | Earle |
| 5,309,409 A | 5/1994 | Jones et al. |
| 5,316,195 A | 5/1994 | Moksnes et al. |
| 5,322,571 A | 6/1994 | Plummer et al. |
| 5,332,312 A | 7/1994 | Evanson |
| 5,345,379 A | 9/1994 | Brous et al. |
| 5,369,032 A | 11/1994 | Pratt |
| 5,370,267 A | 12/1994 | Schroeder |
| 5,389,344 A | 2/1995 | Copeland et al. |
| 5,390,385 A | 2/1995 | Beldham |
| 5,397,028 A | 3/1995 | Jesadanont |
| 5,400,018 A | 3/1995 | Scholl et al. |
| 5,404,893 A | 4/1995 | Brady et al. |
| 5,407,598 A | 4/1995 | Olson et al. |
| 5,411,716 A | 5/1995 | Thomas et al. |
| 5,427,748 A | 6/1995 | Wiedrich et al. |
| 5,430,293 A | 7/1995 | Sato et al. |
| 5,463,595 A | 10/1995 | Rodhall et al. |
| 5,467,481 A | 11/1995 | Srivastava |
| 5,476,385 A | 12/1995 | Parikh et al. |
| 5,480,068 A | 1/1996 | Frazier et al. |
| 5,497,914 A | 3/1996 | Maltsis |
| 5,500,050 A | 3/1996 | Chan et al. |
| 5,505,915 A | 4/1996 | Copeland et al. |
| 5,556,478 A | 9/1996 | Brady et al. |
| 5,570,079 A | 10/1996 | Dockery |
| 5,580,448 A | 12/1996 | Brandreth |

(56) References Cited

U.S. PATENT DOCUMENTS

| | | |
|---|---|---|
| 5,581,982 A | 12/1996 | Schroeder et al. |
| 5,584,025 A | 12/1996 | Keithley et al. |
| 5,584,079 A | 12/1996 | Wong et al. |
| 5,609,417 A | 3/1997 | Otte |
| 5,610,589 A | 3/1997 | Evans et al. |
| 5,619,183 A | 4/1997 | Ziegra et al. |
| 5,625,659 A | 4/1997 | Sears |
| 5,625,908 A | 5/1997 | Shaw |
| 5,632,411 A | 5/1997 | Harty et al. |
| 5,636,008 A | 6/1997 | Lobiondo et al. |
| 5,638,417 A | 6/1997 | Boyer et al. |
| 5,653,269 A | 8/1997 | Miller et al. |
| 5,661,471 A | 8/1997 | Kotlicki |
| 5,671,262 A | 9/1997 | Boyer et al. |
| 5,679,173 A | 10/1997 | Hartman |
| 5,681,400 A | 10/1997 | Brady et al. |
| 5,684,458 A | 11/1997 | Calvarese |
| 5,687,717 A | 11/1997 | Halpern et al. |
| 5,694,323 A | 12/1997 | Koropitzer et al. |
| 5,695,091 A | 12/1997 | Winings et al. |
| 5,724,261 A | 3/1998 | Denny et al. |
| 5,731,526 A | 3/1998 | Kindrick |
| 5,735,925 A | 4/1998 | Scott |
| 5,745,381 A | 4/1998 | Tanaka et al. |
| 5,757,664 A | 5/1998 | Rogers et al. |
| 5,758,300 A | 5/1998 | Abe |
| 5,759,501 A | 6/1998 | Livingston et al. |
| 5,761,278 A | 6/1998 | Pickett et al. |
| 5,762,096 A | 6/1998 | Mirabile |
| 5,764,136 A | 6/1998 | Harron |
| 5,765,605 A | 6/1998 | Waymire et al. |
| 5,769,536 A | 6/1998 | Kotylak |
| 5,771,925 A | 6/1998 | Lewandowski |
| D396,009 S | 7/1998 | Reubens |
| 5,777,895 A | 7/1998 | Kuroda et al. |
| 5,781,942 A | 7/1998 | Allen et al. |
| H1743 H | 8/1998 | Graves et al. |
| 5,793,653 A | 8/1998 | Segal |
| 5,808,553 A | 9/1998 | Cunningham |
| 5,812,059 A | 9/1998 | Shaw et al. |
| 5,821,523 A | 10/1998 | Bunte et al. |
| 5,826,749 A | 10/1998 | Howland et al. |
| 5,827,486 A | 10/1998 | Crossdale |
| 5,839,097 A | 11/1998 | Klausner |
| 5,851,291 A | 12/1998 | Poterala et al. |
| 5,861,881 A | 1/1999 | Freeman et al. |
| 5,864,783 A | 1/1999 | Struck et al. |
| 5,875,430 A | 2/1999 | Koether |
| 5,885,446 A | 3/1999 | McGrew, Jr. |
| 5,887,145 A | 3/1999 | Harari et al. |
| 5,887,975 A | 3/1999 | Mordaunt et al. |
| 5,897,671 A | 4/1999 | Newman et al. |
| 5,900,067 A | 5/1999 | Jones |
| 5,902,749 A | 5/1999 | Lichtwardt et al. |
| 5,913,915 A | 6/1999 | McQuinn |
| 5,917,425 A | 6/1999 | Crimmins et al. |
| 5,919,567 A | 7/1999 | Okada et al. |
| 5,931,877 A | 8/1999 | Smith et al. |
| 5,933,479 A | 8/1999 | Michael et al. |
| 5,938,074 A | 8/1999 | Dartus |
| 5,939,974 A | 8/1999 | Heagle et al. |
| 5,945,910 A | 8/1999 | Gorra |
| 5,952,924 A | 9/1999 | Evans et al. |
| 5,954,069 A | 9/1999 | Foster |
| 5,956,487 A | 9/1999 | Venkatraman et al. |
| 5,979,703 A | 9/1999 | Nystrom |
| 5,961,561 A | 10/1999 | Wakefield, II |
| 5,966,753 A | 10/1999 | Gauthier et al. |
| 5,967,202 A | 10/1999 | Mullen et al. |
| 5,973,696 A | 10/1999 | Agranat et al. |
| 5,974,345 A | 10/1999 | Buck et al. |
| 5,975,352 A | 11/1999 | Spriggs et al. |
| 5,977,913 A | 11/1999 | Christ |
| 5,980,090 A | 11/1999 | Royal et al. |
| 5,987,105 A | 11/1999 | Jenkins et al. |
| 5,992,686 A | 11/1999 | Cline et al. |
| 6,003,070 A | 12/1999 | Frantz |
| 6,007,788 A | 12/1999 | Bellon et al. |
| 6,012,041 A | 1/2000 | Brewer et al. |
| 6,029,286 A | 2/2000 | Funk |
| 6,031,461 A | 2/2000 | Lynn |
| 6,038,331 A | 3/2000 | Johnson |
| 6,049,792 A | 4/2000 | Hart et al. |
| 6,061,668 A | 5/2000 | Sharrow |
| 6,065,639 A | 5/2000 | Maddox et al. |
| 6,073,124 A | 6/2000 | Krishnan et al. |
| 6,082,149 A | 7/2000 | Woods |
| 6,098,843 A | 8/2000 | Soberanis et al. |
| 6,120,175 A | 9/2000 | Tewell |
| 6,125,482 A | 10/2000 | Foster |
| 6,129,449 A | 10/2000 | McCain et al. |
| 6,130,607 A | 10/2000 | McClanahan et al. |
| 6,133,555 A | 10/2000 | Brenn |
| 6,136,184 A | 10/2000 | King |
| 6,147,607 A | 11/2000 | Lynn |
| 6,164,189 A | 12/2000 | Anson |
| 6,167,358 A | 12/2000 | Othmer et al. |
| 6,175,308 B1 | 1/2001 | Tallman et al. |
| 6,191,693 B1 | 2/2001 | Sangsingkeow |
| 6,211,788 B1 | 4/2001 | Lynn et al. |
| 6,213,424 B1 | 4/2001 | Helfer-Grand |
| 6,220,312 B1 | 4/2001 | Hirsch et al. |
| 6,221,788 B1 | 4/2001 | Kobayashi et al. |
| 6,236,317 B1 | 5/2001 | Cohen et al. |
| 6,236,953 B1 | 5/2001 | Segal |
| 6,249,778 B1 | 6/2001 | Vaghi |
| 6,259,956 B1 | 7/2001 | Myers et al. |
| 6,269,975 B2 | 8/2001 | Soberanis et al. |
| 6,278,372 B1 | 8/2001 | Velasco, Jr. et al. |
| 6,279,777 B1 | 8/2001 | Goodin et al. |
| 6,288,641 B1 | 9/2001 | Casais |
| 6,314,282 B1 | 11/2001 | Weber et al. |
| 6,321,204 B1 | 11/2001 | Kazami et al. |
| 6,330,499 B1 | 12/2001 | Chou et al. |
| 6,331,964 B1 | 12/2001 | Barone |
| 6,347,724 B1 | 2/2002 | Chen et al. |
| 6,351,223 B1 | 2/2002 | DeWeerd et al. |
| 6,356,205 B1 | 3/2002 | Salvo et al. |
| 6,357,292 B1 | 3/2002 | Schultz et al. |
| 6,360,181 B1 | 3/2002 | Gemmell et al. |
| 6,368,420 B1 | 4/2002 | Angevaare et al. |
| 6,370,454 B1 | 4/2002 | Moore |
| 6,375,038 B1 | 4/2002 | Daansen et al. |
| 6,377,868 B1 | 4/2002 | Gardner, Jr. |
| 6,392,546 B1 | 5/2002 | Smith |
| 6,404,837 B1 | 6/2002 | Thompson et al. |
| 6,417,773 B1 | 7/2002 | Vlahos et al. |
| 6,418,371 B1 | 7/2002 | Arnold |
| 6,426,701 B1 | 7/2002 | Levy et al. |
| 6,438,471 B1 | 8/2002 | Katagishi et al. |
| 6,463,940 B1 | 10/2002 | Thomas et al. |
| 6,472,615 B1 | 10/2002 | Carlson |
| 6,476,385 B1 | 11/2002 | Albert |
| 6,485,979 B1 | 11/2002 | Kippenhan et al. |
| 6,490,513 B1 | 12/2002 | Fish et al. |
| 6,523,193 B2 | 2/2003 | Saraya |
| 6,524,390 B1 | 2/2003 | Jones |
| 6,547,097 B1 | 4/2003 | Cavallaro et al. |
| 6,561,381 B1 | 5/2003 | Osterheld et al. |
| 6,577,240 B2 | 6/2003 | Armstrong |
| 6,611,207 B1 | 8/2003 | Yuan et al. |
| 6,681,003 B2 | 1/2004 | Linder et al. |
| 6,697,706 B2 | 2/2004 | Gardner, Jr. |
| 6,707,873 B2 | 3/2004 | Thompson et al. |
| 6,727,818 B1 | 4/2004 | Wildman et al. |
| 6,730,024 B2 | 5/2004 | Freyre et al. |
| 6,749,148 B2 | 6/2004 | Helfer-Grand |
| 6,759,959 B2 | 7/2004 | Wildman |
| 6,778,092 B2 | 8/2004 | Braune |
| 6,781,523 B2 | 8/2004 | Matsui et al. |
| 6,792,395 B2 | 9/2004 | Roberts |
| 6,799,085 B1 | 9/2004 | Crisp, III |
| 6,807,460 B2 | 10/2004 | Black et al. |
| 6,882,278 B2 | 4/2005 | Winings et al. |

(56) References Cited

U.S. PATENT DOCUMENTS

| | | |
|---|---|---|
| 6,882,315 B2 | 4/2005 | Richley et al. |
| 6,883,563 B2 | 4/2005 | Smith |
| 6,893,321 B1 | 5/2005 | Buchanan et al. |
| 6,896,140 B1 | 5/2005 | Perry |
| 6,897,780 B2 | 5/2005 | Ulrich et al. |
| 6,917,290 B2 | 7/2005 | Land |
| 6,919,567 B2 | 7/2005 | Iwasawa |
| 6,921,000 B2 | 7/2005 | Wagner et al. |
| 6,950,683 B2 | 9/2005 | Hunt |
| 6,956,498 B1 | 10/2005 | Gauthier et al. |
| 6,975,231 B2 | 12/2005 | Lane et al. |
| 6,977,588 B2 | 12/2005 | Schotz et al. |
| 6,987,228 B1 | 1/2006 | MacMichael et al. |
| 7,015,816 B2 | 3/2006 | Wildman et al. |
| 7,023,341 B2 | 4/2006 | Stilp |
| 7,023,356 B2 | 4/2006 | Burkhardt et al. |
| 7,042,361 B2 | 5/2006 | Kazdin et al. |
| 7,056,050 B2 | 6/2006 | Sacks |
| 7,067,054 B2 | 6/2006 | Fritze |
| 7,069,188 B2 | 6/2006 | Roberts |
| 7,075,412 B1 | 7/2006 | Reynolds et al. |
| 7,099,781 B1 | 8/2006 | Heidl et al. |
| 7,099,856 B2 | 8/2006 | Barangan et al. |
| 7,117,374 B2 | 10/2006 | Hill et al. |
| 7,119,688 B2 | 10/2006 | Wildman |
| 7,119,692 B2 | 10/2006 | Lieffort et al. |
| 7,128,215 B2 | 10/2006 | Danechi |
| 7,142,108 B2 | 11/2006 | Diener et al. |
| 7,154,397 B2 | 12/2006 | Zerhusen et al. |
| 7,157,045 B2 | 1/2007 | McVey |
| 7,160,846 B2 | 1/2007 | Biering et al. |
| 7,175,048 B2 | 2/2007 | Wolfschaffner |
| 7,187,287 B2 | 3/2007 | Ryal |
| 7,191,090 B1 | 3/2007 | Cunningham |
| 7,201,005 B2 | 4/2007 | Voglewede et al. |
| 7,201,290 B2 | 4/2007 | Mehus et al. |
| 7,202,780 B2 | 4/2007 | Teller |
| 7,228,990 B2 | 6/2007 | Schmidt |
| 7,236,097 B1 | 6/2007 | Cunningham |
| 7,242,306 B2 | 7/2007 | Wildman et al. |
| 7,242,307 B1 | 7/2007 | LeBlond et al. |
| 7,248,933 B2 | 7/2007 | Wildman |
| 7,265,673 B2 | 9/2007 | Teller |
| 7,266,347 B2 | 9/2007 | Gross |
| 7,267,531 B2 | 9/2007 | Anderson et al. |
| 7,271,728 B2 | 9/2007 | Taylor et al. |
| 7,272,537 B2 | 9/2007 | Mogadam |
| 7,286,057 B2 | 10/2007 | Bolling |
| 7,292,914 B2 | 11/2007 | Jungmann et al. |
| 7,293,645 B2 | 11/2007 | Harper et al. |
| 7,315,245 B2 | 1/2008 | Lynn et al. |
| 7,320,418 B2 | 1/2008 | Sassoon |
| 7,330,108 B2 | 2/2008 | Thomas |
| 7,372,367 B2 | 5/2008 | Lane et al. |
| 7,375,640 B1 | 5/2008 | Plost |
| 7,400,264 B2 | 7/2008 | Boaz |
| 7,408,470 B2 | 8/2008 | Wildman et al. |
| 7,410,290 B2 | 8/2008 | Tanaka |
| 7,411,511 B2 | 8/2008 | Kennish et al. |
| 7,423,533 B1 | 9/2008 | LeBlond et al. |
| 7,425,900 B2 | 9/2008 | Lynn et al. |
| 7,440,620 B1 | 10/2008 | Aartsen |
| 7,443,302 B2 | 10/2008 | Reeder et al. |
| 7,443,305 B2 | 10/2008 | Verdiramo |
| RE40,588 E | 11/2008 | Ostendorf et al. |
| 7,450,472 B2 | 11/2008 | Guyvarch |
| 7,457,869 B2 | 11/2008 | Kernan |
| 7,474,215 B2 | 1/2009 | Scott et al. |
| 7,477,148 B2 | 1/2009 | Lynn et al. |
| 7,482,936 B2 | 1/2009 | Bolling |
| 7,486,193 B2 | 2/2009 | Elwell |
| 7,487,538 B2 | 2/2009 | Mok |
| 7,490,045 B1 | 2/2009 | Flores et al. |
| 7,496,479 B2 | 2/2009 | Garcia et al. |
| 7,530,729 B2 | 5/2009 | O'Callaghan |
| 7,538,680 B2 | 5/2009 | Scott et al. |
| 7,551,092 B1 | 6/2009 | Henry |
| 7,597,122 B1 | 10/2009 | Smith |
| 7,600,137 B2 | 10/2009 | Trappeniers et al. |
| 7,605,704 B2 | 10/2009 | Munro et al. |
| 7,611,030 B2 | 11/2009 | Reynolds et al. |
| 7,616,122 B2 | 11/2009 | Bolling |
| 7,682,464 B2 | 3/2010 | Glenn et al. |
| 7,718,395 B2 | 5/2010 | Carling |
| 7,755,494 B2 | 7/2010 | Melker et al. |
| 7,770,782 B2 | 8/2010 | Sahud |
| 7,780,453 B2 | 8/2010 | Carling |
| 7,783,380 B2 | 8/2010 | York et al. |
| 7,785,109 B2 | 8/2010 | Carling |
| 7,812,730 B2 | 10/2010 | Wildman et al. |
| 7,855,651 B2 | 12/2010 | LeBlond et al. |
| 7,891,523 B2 | 2/2011 | Mehus et al. |
| 7,893,842 B2 | 2/2011 | Deutsch |
| 7,898,407 B2 | 3/2011 | Hufton et al. |
| 7,952,484 B2 | 5/2011 | Lynn |
| 7,978,564 B2 | 7/2011 | De La Huerga |
| 7,982,619 B2 | 7/2011 | Bolling |
| 8,020,733 B2 | 9/2011 | Snodgrass |
| 8,026,821 B2 | 9/2011 | Reeder et al. |
| 8,040,245 B2 | 10/2011 | Koblasz |
| 8,045,498 B2 | 10/2011 | Hyland |
| 8,056,768 B2 | 11/2011 | Snodgrass |
| 8,085,155 B2 | 12/2011 | Prodanovich et al. |
| D654,743 S | 2/2012 | Rospierski |
| 8,146,613 B2 | 4/2012 | Barnhill et al. |
| 8,152,027 B1 | 4/2012 | Baker |
| 8,154,412 B2 | 4/2012 | Verdiramo |
| 8,196,810 B2 | 6/2012 | Sahud |
| 8,212,653 B1 | 7/2012 | Goldstein et al. |
| 8,237,558 B2 | 8/2012 | Momen et al. |
| 8,240,517 B1 | 8/2012 | Stob et al. |
| 8,249,295 B2 | 8/2012 | Johnson |
| 8,258,965 B2 | 9/2012 | Reeder et al. |
| 8,264,343 B2 | 9/2012 | Snodgrass |
| 8,279,063 B2 | 10/2012 | Wohltjen |
| 8,294,585 B2 | 10/2012 | Barnhill |
| 8,342,365 B2 | 1/2013 | Snodgrass |
| 8,344,893 B1* | 1/2013 | Drammeh ............ G08B 21/245 340/540 |
| 8,350,706 B2 | 1/2013 | Wegelin et al. |
| 8,368,544 B2 | 2/2013 | Wildman et al. |
| 8,372,207 B1 | 2/2013 | Shields |
| 8,395,515 B2 | 3/2013 | Tokhtuev |
| 8,400,309 B2 | 3/2013 | Glenn et al. |
| 8,427,323 B2 | 4/2013 | Alper et al. |
| 8,482,406 B2 | 7/2013 | Snodgrass |
| 8,502,680 B2 | 8/2013 | Tokhtuev et al. |
| 8,502,681 B2 | 8/2013 | Bolling et al. |
| 8,511,512 B2 | 8/2013 | Carlson et al. |
| 8,525,666 B2 | 9/2013 | Melker et al. |
| 8,558,660 B2 | 10/2013 | Nix et al. |
| 8,558,701 B2 | 10/2013 | Wegelin et al. |
| 8,564,431 B2 | 10/2013 | Snodgrass |
| D693,140 S | 11/2013 | Rospierski |
| 8,587,437 B2 | 11/2013 | Kyle et al. |
| 8,598,996 B2 | 12/2013 | Wildman et al. |
| 8,633,806 B2 | 1/2014 | Amir |
| 8,633,816 B2 | 1/2014 | Snodgrass et al. |
| 8,639,527 B2 | 1/2014 | Rensvold et al. |
| 8,646,656 B2 | 2/2014 | Johnson |
| 8,648,724 B2 | 2/2014 | Forsberg et al. |
| 8,668,145 B2 | 3/2014 | Tessier |
| 8,674,840 B2 | 3/2014 | Snodgrass |
| 8,698,637 B2 | 4/2014 | Raichman |
| 8,776,817 B2 | 7/2014 | Sawaski et al. |
| 8,783,511 B2 | 7/2014 | Snodgrass |
| 8,786,429 B2 | 7/2014 | Li et al. |
| 8,816,860 B2 | 8/2014 | Ophardt et al. |
| 8,823,525 B2 | 9/2014 | Cartner et al. |
| 8,842,406 B2 | 9/2014 | Tseng et al. |
| 8,847,752 B2 | 9/2014 | Wegelin et al. |
| 8,872,665 B2 | 10/2014 | Snodgrass |
| 8,903,416 B1 | 12/2014 | Perkins et al. |
| 8,963,721 B2 | 2/2015 | Harris et al. |

(56) References Cited

U.S. PATENT DOCUMENTS

| | | |
|---|---|---|
| 8,963,723 B2 | 2/2015 | Snodgrass |
| 8,976,031 B2 | 3/2015 | Ophardt |
| 8,988,228 B2 | 3/2015 | Iseri et al. |
| 8,990,098 B2 | 3/2015 | Swart et al. |
| 8,994,537 B2 | 3/2015 | Pokrajac |
| 8,999,261 B2 | 4/2015 | Benedtto |
| 9,000,930 B2 | 4/2015 | Pelland et al. |
| 9,047,755 B2 | 6/2015 | Bonner |
| 9,076,044 B2 | 7/2015 | Dryer et al. |
| 9,111,435 B2 | 8/2015 | Gips et al. |
| 9,117,361 B1 | 8/2015 | Hennigan et al. |
| 9,123,233 B2 | 9/2015 | Hermann |
| 9,159,216 B2 | 10/2015 | Limbert et al. |
| 9,218,734 B2 | 12/2015 | Wallace et al. |
| 9,235,977 B2 | 1/2016 | Deutsch |
| 9,239,361 B2 | 1/2016 | Long |
| 9,262,905 B2 | 2/2016 | Wegelin et al. |
| 9,271,611 B2 | 3/2016 | Stratman |
| 9,271,612 B2 | 3/2016 | Miller |
| 9,311,809 B2 | 4/2016 | Diaz |
| 9,317,817 B2 | 4/2016 | Barsky |
| 9,328,490 B2 | 5/2016 | Bayley et al. |
| 9,349,274 B2 | 5/2016 | Wegelin et al. |
| 9,373,242 B1 | 6/2016 | Conrad et al. |
| 9,437,103 B2 | 9/2016 | Ophardt |
| 9,472,089 B2 | 10/2016 | Alhazme |
| 9,478,118 B2 | 10/2016 | Keown et al. |
| 9,497,428 B2 | 11/2016 | Gaisser et al. |
| 9,524,480 B2 | 12/2016 | Christensen |
| 9,524,632 B2 | 12/2016 | Moore |
| 9,526,380 B2 | 12/2016 | Hamilton et al. |
| 9,536,415 B2 | 1/2017 | De Luca et al. |
| 9,633,543 B2 | 4/2017 | Wegelin et al. |
| 9,633,544 B2 | 4/2017 | Wegelin et al. |
| 9,633,545 B2 | 4/2017 | Wegelin et al. |
| 9,640,059 B2 | 5/2017 | Hyland |
| 9,824,569 B2 | 11/2017 | Snodgrass |
| 9,881,485 B2 | 1/2018 | Hajdenberg |
| 2001/0023841 A1 | 9/2001 | Zimmerman et al. |
| 2001/0028308 A1 | 10/2001 | De La Huerga |
| 2001/0039501 A1 | 11/2001 | Crevel et al. |
| 2001/0047214 A1 | 11/2001 | Cocking et al. |
| 2001/0053939 A1 | 12/2001 | Crevel et al. |
| 2001/0054038 A1 | 12/2001 | Crevel et al. |
| 2002/0000449 A1 | 1/2002 | Armstrong |
| 2002/0014496 A1 | 2/2002 | Cline et al. |
| 2002/0019709 A1 | 2/2002 | Segal |
| 2002/0050006 A1 | 5/2002 | Saraya |
| 2002/0096537 A1 | 7/2002 | Gardner, Jr. |
| 2002/0103671 A1 | 8/2002 | Pederson et al. |
| 2002/0107744 A1 | 8/2002 | Rosenberg et al. |
| 2002/0132343 A1 | 9/2002 | Lum |
| 2002/0135486 A1 | 9/2002 | Brohagen et al. |
| 2002/0145523 A1 | 10/2002 | Robaey |
| 2002/0168216 A1 | 11/2002 | Policicchio et al. |
| 2002/0175182 A1 | 11/2002 | Matthews |
| 2002/0183979 A1 | 12/2002 | Wildman |
| 2003/0030562 A1 | 2/2003 | Lane et al. |
| 2003/0033396 A1 | 2/2003 | McCall |
| 2003/0043688 A1 | 3/2003 | Peterson et al. |
| 2003/0065536 A1 | 4/2003 | Hansen et al. |
| 2003/0074222 A1 | 4/2003 | Rosow et al. |
| 2003/0109057 A1 | 6/2003 | DiCesare et al. |
| 2003/0121561 A1 | 7/2003 | Wagner et al. |
| 2003/0155035 A1 | 8/2003 | Ichikawa et al. |
| 2003/0182180 A1 | 9/2003 | Zarrow |
| 2004/0001009 A1 | 1/2004 | Winings et al. |
| 2004/0015269 A1 | 1/2004 | Jungmann et al. |
| 2004/0028608 A1 | 2/2004 | Saul et al. |
| 2004/0049369 A1 | 3/2004 | Konicek et al. |
| 2004/0075347 A1 | 4/2004 | Biskup, Sr. et al. |
| 2004/0088076 A1 | 5/2004 | Gardner, Jr. |
| 2004/0090333 A1 | 5/2004 | Wildman et al. |
| 2004/0148196 A1 | 7/2004 | Kalies |
| 2004/0150527 A1 | 8/2004 | Harper et al. |
| 2004/0162850 A1 | 8/2004 | Sanville et al. |
| 2004/0220844 A1 | 11/2004 | Sanville et al. |
| 2004/0226956 A1 | 11/2004 | Brooks |
| 2004/0226959 A1 | 11/2004 | Mehus et al. |
| 2004/0230339 A1 | 11/2004 | Maser et al. |
| 2005/0065644 A1 | 3/2005 | Gardner, Jr. et al. |
| 2005/0072793 A1 | 4/2005 | Mehus et al. |
| 2005/0086341 A1 | 4/2005 | Enga et al. |
| 2005/0102059 A1 | 5/2005 | Gardner et al. |
| 2005/0102167 A1 | 5/2005 | Kapoor |
| 2005/0134465 A1 | 6/2005 | Rice et al. |
| 2005/0134466 A1 | 6/2005 | Tirkel |
| 2005/0149341 A1 | 7/2005 | Eguchi et al. |
| 2005/0171634 A1 | 8/2005 | York et al. |
| 2005/0222889 A1 | 10/2005 | Lai et al. |
| 2005/0248461 A1 | 11/2005 | Lane et al. |
| 2006/0067545 A1 | 3/2006 | Lewis et al. |
| 2006/0067546 A1 | 3/2006 | Lewis et al. |
| 2006/0071799 A1 | 4/2006 | Verdiramo |
| 2006/0104245 A1 | 5/2006 | Narayanaswami et al. |
| 2006/0132316 A1 | 6/2006 | Wildman et al. |
| 2006/0139449 A1 | 6/2006 | Cheng et al. |
| 2006/0140703 A1 | 6/2006 | Sacks |
| 2006/0154642 A1 | 7/2006 | Scannell, Jr. |
| 2006/0156415 A1 | 7/2006 | Rubinstein et al. |
| 2006/0191068 A1 | 8/2006 | Vlahos et al. |
| 2006/0223731 A1 | 10/2006 | Carling |
| 2006/0229821 A1 | 10/2006 | Brossette et al. |
| 2006/0240397 A1 | 10/2006 | Lynn et al. |
| 2006/0272361 A1 | 12/2006 | Snodgrass |
| 2006/0273915 A1 | 12/2006 | Snodgrass |
| 2006/0277065 A1 | 12/2006 | Guten et al. |
| 2007/0008146 A1 | 1/2007 | Taylor et al. |
| 2007/0008147 A1 | 1/2007 | Bolling |
| 2007/0008149 A1 | 1/2007 | Bolling |
| 2007/0016466 A1 | 1/2007 | Taylor |
| 2007/0020212 A1 | 1/2007 | Bernal et al. |
| 2007/0029962 A1 | 2/2007 | Saeki |
| 2007/0044819 A1 | 3/2007 | Chan et al. |
| 2007/0055483 A1 | 3/2007 | Lee et al. |
| 2007/0056091 A1 | 3/2007 | Bolton et al. |
| 2007/0069884 A1 | 3/2007 | Waxman |
| 2007/0096930 A1 | 5/2007 | Cardoso |
| 2007/0135866 A1 | 6/2007 | Baker et al. |
| 2007/0182581 A1 | 8/2007 | Elwell |
| 2007/0198067 A1 | 8/2007 | Van den Heuvel et al. |
| 2007/0205861 A1 | 9/2007 | Nair et al. |
| 2007/0213877 A1 | 9/2007 | Hart et al. |
| 2007/0222599 A1 | 9/2007 | Coveley et al. |
| 2007/0229288 A1 | 10/2007 | Ogrin et al. |
| 2007/0247316 A1 | 10/2007 | Wildman et al. |
| 2007/0257803 A1 | 11/2007 | Munro et al. |
| 2007/0285277 A1 | 12/2007 | Scott et al. |
| 2007/0290865 A1 | 12/2007 | Lynn et al. |
| 2008/0001763 A1 | 1/2008 | Raja et al. |
| 2008/0019489 A1 | 1/2008 | Lynn |
| 2008/0019490 A1 | 1/2008 | Lynn |
| 2008/0046278 A1 | 2/2008 | Sanville et al. |
| 2008/0084315 A1 | 4/2008 | Pittz |
| 2008/0087719 A1 | 4/2008 | Sahud |
| 2008/0095677 A1 | 4/2008 | McSherry et al. |
| 2008/0100441 A1 | 5/2008 | Prodanovich et al. |
| 2008/0103636 A1 | 5/2008 | Glenn et al. |
| 2008/0131332 A1 | 6/2008 | Nguyen et al. |
| 2008/0136649 A1 | 6/2008 | Van De Hey |
| 2008/0177155 A1 | 7/2008 | Hansen et al. |
| 2008/0185540 A1 | 8/2008 | Turner et al. |
| 2008/0189142 A1 | 8/2008 | Brown et al. |
| 2008/0193631 A1 | 8/2008 | Kanamori et al. |
| 2008/0246599 A1 | 10/2008 | Hufton et al. |
| 2008/0262097 A1 | 10/2008 | Eady et al. |
| 2008/0266113 A1 | 10/2008 | Kennish et al. |
| 2008/0267408 A1 | 10/2008 | Hsieh |
| 2008/0271928 A1 | 11/2008 | Mehus et al. |
| 2008/0280380 A1 | 11/2008 | Dietz et al. |
| 2008/0283145 A1 | 11/2008 | Maxwell |
| 2008/0290112 A1 | 11/2008 | Lynn |
| 2008/0303658 A1 | 12/2008 | Melker et al. |
| 2009/0002644 A1 | 1/2009 | Christensen et al. |

(56) References Cited

U.S. PATENT DOCUMENTS

| | | |
|---|---|---|
| 2009/0019552 A1 | 1/2009 | McLaughlin et al. |
| 2009/0030721 A1 | 1/2009 | Garcia et al. |
| 2009/0037026 A1 | 2/2009 | Sostaric et al. |
| 2009/0049610 A1 | 2/2009 | Heimbrock et al. |
| 2009/0051545 A1* | 2/2009 | Koblasz ............... G08B 21/245 340/573.1 |
| 2009/0068116 A1 | 3/2009 | Arndt |
| 2009/0084407 A1 | 4/2009 | Glenn et al. |
| 2009/0090564 A1 | 4/2009 | Kresina |
| 2009/0091458 A1 | 4/2009 | Deutsch |
| 2009/0102681 A1 | 4/2009 | Brennan, Jr. et al. |
| 2009/0112360 A1 | 4/2009 | Berg |
| 2009/0112541 A1 | 4/2009 | Anderson et al. |
| 2009/0112630 A1 | 4/2009 | Collins, Jr. et al. |
| 2009/0119142 A1 | 5/2009 | Yenni et al. |
| 2009/0125424 A1 | 5/2009 | Wegelin |
| 2009/0127282 A1 | 5/2009 | Reynolds et al. |
| 2009/0138303 A1 | 5/2009 | Seshadri |
| 2009/0145925 A1 | 6/2009 | Wegelin |
| 2009/0148342 A1 | 6/2009 | Bromberg et al. |
| 2009/0171502 A1 | 7/2009 | Freidin |
| 2009/0195385 A1 | 8/2009 | Huang et al. |
| 2009/0204256 A1 | 8/2009 | Wegelin |
| 2009/0219131 A1 | 9/2009 | Barnett |
| 2009/0219172 A1 | 9/2009 | Wilbrod |
| 2009/0224907 A1 | 9/2009 | Sinha et al. |
| 2009/0224924 A1 | 9/2009 | Thorp |
| 2009/0266842 A1 | 10/2009 | Snodgrass |
| 2009/0267776 A1 | 10/2009 | Glenn et al. |
| 2009/0272405 A1 | 11/2009 | Barnhill et al. |
| 2009/0273477 A1 | 11/2009 | Barnhill |
| 2009/0276239 A1 | 11/2009 | Swart et al. |
| 2009/0294469 A1 | 12/2009 | Poulain et al. |
| 2009/0299787 A1 | 12/2009 | Barnhill |
| 2009/0301523 A1 | 12/2009 | Barnhill et al. |
| 2010/0084486 A1 | 4/2010 | Kim |
| 2010/0094581 A1 | 4/2010 | Cagle |
| 2010/0097224 A1 | 4/2010 | Prodanovich et al. |
| 2010/0117823 A1 | 5/2010 | Wholtjen |
| 2010/0117836 A1* | 5/2010 | Seyed Momen ......... G01S 1/70 340/573.1 |
| 2010/0134296 A1 | 6/2010 | Hwang |
| 2010/0153374 A1 | 6/2010 | LeBlond et al. |
| 2010/0173581 A1 | 7/2010 | Dolan |
| 2010/0188228 A1 | 7/2010 | Hyland |
| 2010/0233020 A1 | 9/2010 | Klaassen et al. |
| 2010/0238021 A1 | 9/2010 | Harris |
| 2010/0274640 A1 | 10/2010 | Morey et al. |
| 2010/0315243 A1 | 12/2010 | Tokhtuev et al. |
| 2010/0315244 A1 | 12/2010 | Tokhtuev et al. |
| 2010/0328076 A1 | 12/2010 | Kyle et al. |
| 2010/0332022 A1 | 12/2010 | Wegelin et al. |
| 2011/0063106 A1 | 3/2011 | Snodgrass |
| 2011/0088809 A1 | 4/2011 | Lin |
| 2011/0093313 A1 | 4/2011 | LeBlond et al. |
| 2011/0291841 A1 | 4/2011 | Hollock et al. |
| 2011/0121974 A1 | 5/2011 | Tenarvitz et al. |
| 2011/0169645 A1 | 7/2011 | Cartner et al. |
| 2011/0169646 A1 | 7/2011 | Raichman |
| 2011/0193703 A1 | 8/2011 | Payton et al. |
| 2011/0196720 A1 | 8/2011 | Guten et al. |
| 2011/0234598 A1 | 9/2011 | Scarola et al. |
| 2011/0260872 A1 | 10/2011 | Kennish et al. |
| 2011/0273298 A1 | 11/2011 | Snodgrass et al. |
| 2011/0296664 A1 | 12/2011 | Minard et al. |
| 2011/0316695 A1 | 12/2011 | Li et al. |
| 2011/0316701 A1 | 12/2011 | Alper et al. |
| 2011/0316703 A1 | 12/2011 | Butler et al. |
| 2012/0024890 A1 | 2/2012 | Ota et al. |
| 2012/0047988 A1 | 3/2012 | Mehus et al. |
| 2012/0062382 A1 | 3/2012 | Taneff |
| 2012/0112906 A1 | 5/2012 | Borke et al. |
| 2012/0112914 A1 | 5/2012 | Wegelin et al. |
| 2012/0168459 A1 | 7/2012 | D'Onofrio |
| 2012/0212344 A1* | 8/2012 | Forsberg ............... G08B 3/10 340/573.1 |
| 2012/0245729 A1 | 9/2012 | Wegelin et al. |
| 2012/0256742 A1 | 10/2012 | Snodgrass et al. |
| 2012/0310664 A1 | 12/2012 | Long et al. |
| 2012/0329438 A1 | 12/2012 | Snodgrass |
| 2013/0045685 A1 | 2/2013 | Kiani |
| 2013/0075346 A1 | 3/2013 | Rumberger et al. |
| 2013/0076514 A1 | 3/2013 | Wegelin et al. |
| 2013/0091631 A1 | 4/2013 | Hayes et al. |
| 2013/0099900 A1 | 4/2013 | Pulvermacher |
| 2013/0113931 A1 | 5/2013 | Alper |
| 2013/0120120 A1 | 5/2013 | Long et al. |
| 2013/0133762 A1 | 5/2013 | Snodgrass |
| 2013/0224076 A1 | 8/2013 | Hansmann et al. |
| 2013/0229276 A1 | 9/2013 | Hunter |
| 2013/0234855 A1 | 9/2013 | Knighton |
| 2013/0257615 A1 | 10/2013 | Iseri et al. |
| 2013/0261795 A1 | 10/2013 | Long et al. |
| 2013/0264355 A1 | 10/2013 | Jodoin |
| 2013/0285814 A1 | 10/2013 | Snodgrass |
| 2013/0290016 A1 | 10/2013 | Alper et al. |
| 2013/0292407 A1 | 11/2013 | Beavis et al. |
| 2013/0306105 A1 | 11/2013 | Battah |
| 2013/0332184 A1 | 12/2013 | Burnham et al. |
| 2013/0333184 A1 | 12/2013 | Couture et al. |
| 2013/0342349 A1 | 12/2013 | Cruz |
| 2014/0009292 A1 | 1/2014 | Long et al. |
| 2014/0015670 A1 | 1/2014 | Wegelin et al. |
| 2014/0070950 A1 | 3/2014 | Snodgrass |
| 2014/0081653 A1 | 3/2014 | Davis et al. |
| 2014/0108039 A1 | 4/2014 | Rensvold et al. |
| 2014/0180713 A1 | 6/2014 | Tenarvitz et al. |
| 2014/0210620 A1 | 7/2014 | Snodgrass |
| 2014/0214449 A1 | 7/2014 | Long et al. |
| 2014/0231455 A1 | 8/2014 | Jersey et al. |
| 2014/0242562 A1 | 8/2014 | McSterling et al. |
| 2014/0253334 A1 | 9/2014 | Hanlin et al. |
| 2014/0279603 A1 | 9/2014 | Ortiz et al. |
| 2014/0320289 A1 | 10/2014 | Raichman |
| 2014/0327545 A1 | 11/2014 | Bolling et al. |
| 2014/0333433 A1 | 11/2014 | Li et al. |
| 2014/0347185 A1 | 11/2014 | Smith et al. |
| 2014/0361898 A1 | 12/2014 | Wegelin et al. |
| 2014/0366264 A1 | 12/2014 | Ciavarella et al. |
| 2014/0368320 A1 | 12/2014 | Hyland |
| 2015/0022361 A1 | 1/2015 | Gaisser et al. |
| 2015/0035678 A1 | 2/2015 | Long |
| 2015/0048940 A1 | 2/2015 | Keown et al. |
| 2015/0070174 A1 | 3/2015 | Douglas |
| 2015/0101121 A1 | 4/2015 | Burgo Sr., et al. |
| 2015/0127365 A1 | 5/2015 | Rizvi et al. |
| 2015/0134354 A1 | 5/2015 | Alper et al. |
| 2015/0134357 A1 | 5/2015 | Davis et al. |
| 2015/0179047 A1 | 6/2015 | Wallace et al. |
| 2015/0194043 A1 | 7/2015 | Dunn et al. |
| 2015/0199883 A1 | 7/2015 | Hartley et al. |
| 2015/0221208 A1 | 8/2015 | Knighton et al. |
| 2015/0278456 A1 | 10/2015 | Bermudez Rodriguez et al. |
| 2015/0308149 A1 | 10/2015 | Oshymansky et al. |
| 2015/0313422 A1 | 11/2015 | Ophardt et al. |
| 2015/0366411 A1 | 12/2015 | Yang et al. |
| 2016/0042635 A1 | 2/2016 | Rosebraugh et al. |
| 2016/0068383 A1 | 3/2016 | Falco, III |
| 2016/0093195 A1 | 3/2016 | Ophardt |
| 2016/0128520 A1 | 5/2016 | Wegelin et al. |
| 2016/0140830 A1 | 5/2016 | Hathorn |
| 2016/0174022 A1 | 6/2016 | Nhu |
| 2016/0179089 A1 | 6/2016 | Stratmann |
| 2016/0240070 A1 | 8/2016 | Wegelin et al. |
| 2016/0249774 A1 | 9/2016 | Ophardt et al. |
| 2016/0267772 A1 | 9/2016 | Iseri et al. |
| 2016/0292992 A1 | 10/2016 | Ortiz et al. |
| 2017/0004287 A1 | 1/2017 | O'Toole |

(56) References Cited

U.S. PATENT DOCUMENTS

| | | |
|---|---|---|
| 2017/0098366 A1 | 4/2017 | Hood et al. |
| 2018/0255981 A1 | 9/2018 | Rospierski |

FOREIGN PATENT DOCUMENTS

| | | |
|---|---|---|
| AU | 2015202637 A1 | 6/2015 |
| AU | 2015258158 A1 | 12/2015 |
| AU | 2015275337 A1 | 1/2016 |
| AU | 2013378514 B2 | 11/2017 |
| BR | 102012030486 A2 | 9/2014 |
| CA | 2605412 A1 | 12/2006 |
| CA | 2592814 A1 | 12/2007 |
| CA | 2674654 A1 | 10/2009 |
| CA | 2776280 A1 | 11/2013 |
| CA | 2780411 A1 | 12/2013 |
| CA | 2807337 A1 | 8/2014 |
| CA | 2914864 A1 | 6/2016 |
| CN | 2354482 Y | 12/1999 |
| CN | 1181415 C | 12/2004 |
| CN | 100340935 C | 10/2007 |
| CN | 101592510 A | 12/2009 |
| CN | 201974318 U | 9/2011 |
| CN | 202677403 U | 1/2013 |
| CN | 103169409 A | 6/2013 |
| CN | 103198628 A | 7/2013 |
| CN | 203153706 U | 8/2013 |
| CN | 203325033 U | 12/2013 |
| CN | 103617349 A | 3/2014 |
| CN | 204218783 U | 3/2015 |
| CN | 104615091 A | 5/2015 |
| CN | 104622348 A | 5/2015 |
| CN | 204520455 U | 8/2015 |
| CN | 105139320 A | 12/2015 |
| CN | 105164737 A | 12/2015 |
| CN | 204990347 U | 1/2016 |
| CN | 101911108 B | 2/2016 |
| CN | 205197874 U | 5/2016 |
| CN | 106154902 A | 11/2016 |
| DE | 69708606 T2 | 8/2002 |
| DE | 10157975 A1 | 6/2003 |
| DE | 69917795 T2 | 7/2005 |
| DE | 19882120 A2 | 10/2010 |
| DE | 102012105365 A1 | 12/2013 |
| DK | 2015665 T3 | 11/2009 |
| EP | 0921506 A1 | 6/1999 |
| EP | 0927535 A2 | 7/1999 |
| EP | 0940110 A1 | 9/1999 |
| EP | 1121500 | 10/1999 |
| EP | 1245016 | 10/2000 |
| EP | 1049998 A2 | 11/2000 |
| EP | 1099400 A2 | 5/2001 |
| EP | 1201172 A2 | 5/2002 |
| EP | 1390204 B1 | 12/2004 |
| EP | 1034132 B1 | 8/2005 |
| EP | 1483728 B1 | 10/2006 |
| EP | 1791077 A2 | 5/2007 |
| EP | 1794727 A1 | 6/2007 |
| EP | 1872802 A1 | 1/2008 |
| EP | 1872892 A1 | 1/2008 |
| EP | 1874264 | 1/2008 |
| EP | 1913892 A2 | 4/2008 |
| EP | 2012277 A1 | 1/2009 |
| EP | 2223642 A2 | 9/2010 |
| EP | 2511889 A2 | 10/2010 |
| EP | 2395490 | 12/2011 |
| EP | 2509017 A2 | 10/2012 |
| EP | 2637540 A2 | 9/2013 |
| EP | 2860716 A1 | 4/2015 |
| EP | 2956918 A1 | 12/2015 |
| EP | 3153984 | 4/2017 |
| FR | 2872315 A1 | 12/2005 |
| FR | 2997779 A1 | 5/2014 |
| GB | 2052251 A | 5/1980 |
| GB | 2137749 A | 10/1984 |
| GB | 2217013 A | 10/1989 |
| GB | 2299405 A | 2/1996 |
| GB | 2298851 A | 9/1996 |
| GB | 2324397 A | 10/1998 |
| GB | 2337327 A | 11/1999 |
| GB | 2340647 A | 2/2000 |
| GB | 2394654 A | 5/2004 |
| GB | 2417810 A | 3/2006 |
| GB | 2417811 A | 3/2006 |
| GB | 2425388 A | 10/2006 |
| GB | 2446871 | 8/2007 |
| GB | 2436793 A | 10/2007 |
| GB | 2437555 A | 10/2007 |
| GB | 2439306 A | 12/2007 |
| GB | 2439457 | 12/2007 |
| GB | 2452189 A | 2/2009 |
| GB | 2457930 A | 9/2009 |
| GB | 2458118 A | 9/2009 |
| GB | 2469482 A | 10/2010 |
| GB | 2474317 A | 4/2011 |
| GB | 2486767 A | 6/2012 |
| GB | 2537179 A | 10/2016 |
| JP | H01219439 A | 9/1989 |
| JP | 10309540 A | 11/1998 |
| JP | 11332961 A | 12/1999 |
| JP | 2001292918 A | 10/2001 |
| JP | 3281375 B2 | 5/2002 |
| JP | 2002197559 | 7/2002 |
| JP | 2003105819 A | 4/2003 |
| JP | 2003122823 A | 4/2003 |
| JP | 2006132277 A | 5/2005 |
| JP | 2005218999 A | 8/2005 |
| JP | 2006198318 A | 8/2006 |
| JP | 2008027436 A | 2/2008 |
| JP | 2009282442 A | 12/2009 |
| JP | 4523219 B2 | 8/2010 |
| JP | 2013017631 A | 1/2013 |
| JP | 2013180046 A | 9/2013 |
| JP | 2013187557 A | 9/2013 |
| JP | 2015153084 A | 8/2015 |
| JP | 2015230207 A | 12/2015 |
| JP | 2016520883 A | 7/2016 |
| KR | 101632716 B1 | 6/2016 |
| KR | 101647831 B1 | 8/2016 |
| MX | 2012015244 A | 4/2013 |
| PT | 882280 E | 5/2002 |
| SG | 186323 A1 | 1/2013 |
| WO | WO/92/13327 A1 | 8/1992 |
| WO | WO/97/31350 A1 | 8/1997 |
| WO | WO/1998/09261 A1 | 3/1998 |
| WO | WO/1998/036258 A2 | 8/1998 |
| WO | WO/9930299 A1 | 6/1999 |
| WO | WO9933008 | 7/1999 |
| WO | WO/2000/22260 A1 | 4/2000 |
| WO | WO 0125730 A1 | 4/2001 |
| WO | WO/2001/033529 A1 | 5/2001 |
| WO | WO/0131532 A2 | 5/2001 |
| WO | WO/2010141612 A1 | 6/2001 |
| WO | WO/2002/021475 A1 | 3/2002 |
| WO | WO/2002/059701 A1 | 8/2002 |
| WO | WO02077927 A1 | 10/2002 |
| WO | WO/2002/094073 A1 | 11/2002 |
| WO | WO/2005/055793 A2 | 6/2003 |
| WO | WO/0359143 A1 | 7/2003 |
| WO | WO/2003/079278 A1 | 9/2003 |
| WO | WO/2003/082351 A2 | 10/2003 |
| WO | WO 2004052162 A1 | 6/2004 |
| WO | WO 2005040984 A2 | 5/2005 |
| WO | WO/2005/055793 A3 | 6/2005 |
| WO | WO/2005/094711 A2 | 10/2005 |
| WO | WO2005117672 A1 | 12/2005 |
| WO | WO/2006/036687 A2 | 4/2006 |
| WO | WO 2006036227 A1 | 4/2006 |
| WO | WO 2006100495 | 9/2006 |
| WO | WO/2006/135922 A3 | 12/2006 |
| WO | WO/2007/001866 A2 | 1/2007 |
| WO | WO/2007/090470 A1 | 8/2007 |
| WO | WO 2007/127495 A2 | 11/2007 |
| WO | WO/2007/129289 A1 | 11/2007 |
| WO | WO/2007/133960 A2 | 11/2007 |

(56) References Cited

FOREIGN PATENT DOCUMENTS

| WO | WO/2008/088424 A1 | 7/2008 |
|---|---|---|
| WO | WO 2008/118143 A2 | 10/2008 |
| WO | WO/2008/133495 A1 | 11/2008 |
| WO | WO 2009/087046 A1 | 7/2009 |
| WO | WO 2009/097096 A1 | 8/2009 |
| WO | WO/2009/097096 A1 | 8/2009 |
| WO | WO/2010/026581 A2 | 3/2010 |
| WO | WO/2010/101929 A2 | 9/2010 |
| WO | WO 2011/038173 A1 | 3/2011 |
| WO | WO 2011085292 A2 | 7/2011 |
| WO | WO 2011131800 A1 | 10/2011 |
| WO | WO 2011161475 A1 | 12/2011 |
| WO | WO/2012/064515 A2 | 5/2012 |
| WO | WO/2012125320 A1 | 11/2012 |
| WO | WO 2012152495 A1 | 11/2012 |
| WO | WO 2012161766 A1 | 11/2012 |
| WO | WO/2013/025889 A1 | 2/2013 |
| WO | WO/2013/025956 A1 | 2/2013 |
| WO | WO 2013/033243 A2 | 3/2013 |
| WO | WO/2013/049357 A2 | 4/2013 |
| WO | WO 2013/049462 A1 | 4/2013 |
| WO | WO 2013/055616 A2 | 4/2013 |
| WO | WO 2013/058821 A1 | 4/2013 |
| WO | WO 2013/063690 A1 | 5/2013 |
| WO | WO 2013/070888 A1 | 5/2013 |
| WO | WO 2013/074660 A1 | 5/2013 |
| WO | WO 2013/140253 A1 | 9/2013 |
| WO | WO 2013/165585 A1 | 11/2013 |
| WO | WO 2013190016 A1 | 12/2013 |
| WO | WO 2014/027030 A2 | 2/2014 |
| WO | WO/2014/037938 A2 | 3/2014 |
| WO | WO/2014/046645 A1 | 3/2014 |
| WO | WO 2014035610 A1 | 3/2014 |
| WO | WO 2014/060726 A1 | 4/2014 |
| WO | WO/2014125320 A1 | 8/2014 |
| WO | WO 2014/205283 A1 | 12/2014 |
| WO | WO/2015/061718 A1 | 4/2015 |
| WO | WO 2015054193 A1 | 4/2015 |
| WO | WO 2015055971 | 4/2015 |
| WO | WO2015070016 A2 | 5/2015 |
| WO | WO 2016168082 A1 | 10/2016 |

OTHER PUBLICATIONS

Al-Hamad et al., "How Clean is Clean? Proposed Methods for Hospital Cleaning Assessment," Journal of Hospital Infection, vol. 70, Oct. 9, 2008, pp. 328-334.
"America's Dirty Little Secret: Second Handwashing Survey Reveals Americans Still Don't Get It," American Society for Microbiology, Sep. 19, 2000, 3 pp.
Anonymous et al., "Hand Hygiene," Progressive Grocer, vol. 76, No. 8, Aug. 1997, pp. 111-112.
"Bentley WiNET Tag User Guide—FAS1503, DOC1036," UltraClenz, Jan. 25, 2011, 12 pp.
Bourn, Auditor General for Wales, "The Management and Delivery of Hospital Cleaning Services in Wales," National Audit Office Wales, 39 pp., May 23, 2003.
CDC, HICPAC, "Guideline for Hand Hygiene in Health-Care Settings," Morbidity and Mortality Weekly Report, Recommendations and Reports, (MMWR) vol. 51, No. RR-16, Oct. 25, 2002, 56 pp.
Dancer, "How do we Assess Hospital Cleaning? A Proposal for Microbiological Standards for Surface Hygiene in Hospitals" Journal of Hospital Infection, vol. 56, Sep. 2003, pp. 10-15.
Diller et al., "Estimation of hand hygiene opportunities on an adult medical ward using 24-hour camera surveillance: Validation of the HOW2 Benchmark Study," American Journal of Infection Control, vol. 42, 2014 (Applicant points out, in accordance with MPEP 609.04(a), that the year of publication, 2014, is sufficiently earlier than the effective U.S. filing date, 2017, so that the particular month of publication is not in issue.) pp. 602-607.

Diversey, Diverlog-L Enhanced "DLE- Production Summary Reports," Apr. 1990, 5 pp.
Diversey, "iMAP TM/MC . . . Data Collection & Reporting Platform," Diversey Inc., Sep. 5, 2013, 2 pp.
Diversey "Sealed Air's Diversey Business Introduces Mobile Application to Capture Facility Auditing Data," Diversey Inc., Oct. 18, 2011, 2 pp.
Diversey, "iMAP Internet Mobile Auditing Platform," Diversey Inc., 2012 (Applicant points out, in accordance with MPEP 609.04(a), that the year of publication, 2012, is sufficiently earlier than the effective U.S. filing date, so that the particular month of publication is not in issue.) 2 pp.
Diversey, "iMAPTM/MC Internet Mobile Auditing Platform", 2012, (Applicant points out, in accordance with MPEP 609.04(a), that the year of publication, 2012, is sufficiently earlier than the effective U.S. filing date, so that the particular month of publication is not in issue.) 2 pp.
Diversey, "Diversey VeriCiean™ System Implementation and Support Guide," 2012, (Applicant points out, in accordance with MPEP 609.04(a), that the year of publication, 2012, is sufficiently earlier than the effective U.S. filing date, so that the particular month of publication is not in issue.) 64 pp.
Diversey, "Unleash Your Data, The power of iMAP is now available on virtually any smart device. Get robust data collection and analysis anytime, anywhere, in any language," Diversey Inc., Sep. 15, 2011, 2 pp.
Diversey, "Reporting," downloaded from Diversey.com, Sep. 5, 2013, 1 pp.
Dix et al., "Environmental Surface Cleaning: First Defense Against Infectious Agents," Infection Control Today Magazine, 6 pp., Dec. 1, 2005.
"Don't Get Caught Dirty Handed," ASM's Microbes Afterhours, Sep. 6, 2009, 11 pp.
"Dr. Semmelweiss Was Right: Washing Hands Prevents Infection," Water Quality and Health Council, retrieved from www.waterandhealth.org/newsletter/new/4/12/2017/right.htm, Feb. 2017, 2 pp.
ECOLAB® BALANCER. COM, MRE, Jun. 4, 1997, 4 pp.
ECOLAB® INC., product brochure: "relax. We've Got Your Pool Concerns Under Control," copyright 1998, (Applicant points out, in accordance with MPEP 609.04(a), that the year of publication, 1998, is sufficiently earlier than the effective U.S. filing date, so that the particular month of publication is not in issue.) 4 pp.
ECOLAB® INC., product brochure: "We'd like to make a couple of things perfectly CLEAR," copyright 1998, (Applicant points out, in accordance with MPEP 609.04(a), that the year of publication, 1998, is sufficiently earlier than the effective U.S. filing date, so that the particular month of publication is not in issue.) 4 pp.
Elliott, "Determining Three Metrics for Cleaning Satisfaction," found at http://www.facilitiesnet.com/fn/article.asp?id-7698, equipmentrentaltools/article/Determining-Three-Metrics-for -Cleaning-Satisfaction-7698#, Nov. 2007, 2 pp.
"Evaluating Municipal Services: Scorecard Cleanliness Program Prospectus," New York, found at http://www.worldsweeper.com/Street/Profiles/NYCScorecard.pdf, archived Jan. 5, 2009, 16 pp.
"Evidence of hand hygiene to reduce transmission and infections by multi-drug resistant organisms in health-care settings," World Health Organization, Jan. 5, 2014, 7 pp.
Exner et al., "Household Cleaning and Surface Disinfection: New Insights and Strategies," Journal of Hospital Infection, vol. 56, Apr. 2004, pp. s70-s75.
Florida Department of Health, "Guidelines for Control of Antibiotic Resistant Organisms," Dec. 20, 1999, 34 pp.
Garner et al., "Guideline for Handwashing and Hospital Environmental Control," CDC Prevention Guidelines, Jan. 1, 1985, 10 pp.
Garner, "Guidelines for Isolation Precautions in Hospitals," Hospital Infection Control Advisory Committee, Jan. 1, 1996, 39 pp.
Green, "Hand hygiene in 2015: 7 Findings," retrieved from http://www.beckershospitalreview.com/quality!hand-hygiene-i n-2015-7-findings.htm 1?tm pl=com ponent&print= 1 &layout=default &page=, Nov. 12, 2015, 1 pp.
Griffith et al., "An Evaluation of Hospital Cleaning Regimes and Standards," J. Hosp. Infect., vol. 45, pp. 19-28, 2000, accepted Dec. 23, 1999.

(56) References Cited

OTHER PUBLICATIONS

Griffith et al., "The Effectiveness of Existing and Modified Cleaning Regimens in a Welsh Hospital," Journal of Hospital Infection, vol. 66, Jul. 26, 2007, pp. 352-359.
Griffith, "Nosocomial infection: Are there lessons from the food industry?" The Biomedical Scientist, pp. 697-699, Aug. 2006.
Hamilton et al., "Hand Hygiene," Wild Iris Medical Education, Inc., 2014, (Applicant points out, in accordance with MPEP 609.04(a), that the year of publication, 2014, is sufficiently earlier than the effective U.S. filing date, 2017, so that the particular month of publication is not in issue.) 24 pp.
"Hand Washing, Cleaning, Disinfection and Sterilization in Health Care," Infection Control Guidelines, Canada Communicable Disease Report, vol. 24S8, Dec. 1998, 66 pp.
HICPAC, "Recommendations for Preventing the Spread of Vancomycin Resistance," Morbidity and CDC Mortality Weekly Report, Recommendations and Reports, vol. 44, No. RR-12, 1-13, Sep. 22, 1995, 16 pp.
"Home Routines for iPhone, iPod touch, and iPad on the iTunes App Store," retrieved from the internet https://litunes.apple.com/us/app/homeroutines/id353117370?mt=8, Sep. 5, 2013, 3 pp.
"Home Routines App for iPhone, iPad, & iPod touch," retrieved from the Internet http://www.homeroutines.com/, (Applicant points out, in accordance with MPEP 609.04(a), that the year of publication, 2010, is sufficiently earlier than the effective U.S. filing date, so that the particular month of publication is not in issue.) 7 pp.
Larson et al., "A Multifaceted Approach to Changing Handwashing Behavior," American Journal of Infection Control, vol. 25, Feb. 1997, pp. 3-10.
Larson, "APIC Guideline for Hand Washing and Hand Antisepsis in Health-Care Settings*," APIC Guidlines Committee, 1995, (Applicant points out, in accordance with MPEP 609.04(a), that the year of publication, 1995, is sufficiently earlier than the effective U.S. filing date, 2017, so that the particular month of publication is not in issue.), Am J Infect Control, 23:251, 18 pp.
Levchenko et al., "Embedded System for Hygiene Compliance Monitoring," IEEE Transactions on Automation Science and Engineering, vol. 7, No. 3, Jul. 2010, 4 pp.
Lewis et al., "A Modified ATP Benchmark for Evaluating the Cleaning of Some Hospital Environmental Surfaces," Journal of Hospital Infection, vol. 69, May 12, 2008, pp. 156-163.
Malik et al., "Use of Audit Tools to Evaluate the Efficacy of Cleaning Systems in Hospitals," Am. J. Infect. Control, vol. 31, No. 3, p. 181-187, May 2003.
Mallow General Hospital, "Hygiene Services Assessment Scheme, Assessment Report," 38 pp., Oct. 2007.
Mangram et al., "Guideline for Prevention of Surgical Site Infection, 1999," Infection Control and Hospital Epidemiology, vol. 20, No. 4, Apr. 1999, pp. 247-278.
"Measuring Hand Hygiene Adherence: Overcoming the Challenges," The Joint Commission et al., 2009 (Applicant points out, in accordance with MPEP 609.04(a), that the year of publication, 2009, is sufficiently earlier than the effective U.S. filing date, 2017, so that the particular month of publication is not in issue.) 234 pp.
Meengs et al., "Hand Washing Frequency in an Emergency Department," Annals of Emergency Medicine, vol. 23, No. 6, Jun. 1994, pp. 1307-1312.
Mills et al., "Guidelines for Working with Rodents Potentially Infected with Hantavirus," Journal of Mammalogy, vol. 76, No. 3, Aug. 1995, pp. 716-722.
Munro et al., "Treating Exposure to Chemical Warfare Agents: Implications for Health Care Providers and Community Emergency Planning," Environmental Health Perspectives, vol. 89, 1990 (Applicant points out, in accordance with MPEP 609.04(a), that the year of publication, 1990, is sufficiently earlier than the effective U.S. filing date, so that the particular month of publication is not in issue.) pp. 205-2015.
"Net/Tech to Unveil Patented Hygiene Guard Hand-Washing Monitoring System at the National Restaurant Show," BusinessWire, Apr. 3, 1997, 3 pp.

Nexgen SI, Inc., "InTouch Water Treatment Information Management Solution," Mar. 29, 1999, 59 pp.
Nova Controls, Nova News, "Save Money and Gain Sales Features?" Aug. 12, 1992, 1pg.
Nova Controls, "ORION Liquid Laundry Supply Dispenser," Feb. 1989, 5 pp.
NOV ALINK™ brochure: "Laundry information System: Overview Reports," Dec. 13, 1995, 6 pp.
NOV ALINK™ Laundry Information System, Control Master Version 2.0 for Windows User's Guide, 2000, 39 pp.
NOV ALINK™ OverViewTM Program Pricing. cited in an IDS in U.S. Appl. No. 10/436,454 on May 20. 2005. 1 pg.
Ophardt, Hygiene-Technik GmbH+ Co. KG, "Making the World a More Hygienic Place", Hygiene Compliance Solutions, 2009 (Applicant points out, in accordance with MPEP 609.04(a), that the year of publication, 2009, is sufficiently earlier than the effective U.S. filing date, so that the particular month of publication is not in issue.) 1 page.
"Patient Safeguard System Healthcare Worker Badge User's Guide," DOC1046 Revision 8, UltraClenz, Mar. 14, 2012, 21 pp.
Persyst Inc., "Dial-A-Wash Automatic Laundry Room Attendant for Apartment and Complex Laundry Rooms," cited in an IDS in U.S. Appl. No. 10/436,454 on May 20, 2005, 2 pp.
Persyst Inc., "LDAS-2000 Remote Information Control and Management System for the Commercial Laundryand Vending Industry," cited in an IDS in U.S. Appl. No. 10/436,454 on May 20, 2005, 4 pp.
Pittet et al., "Compliance with Handwashing in a Teaching Hospital," Annals of Internal Medicine, vol. 130, No. 2, Jan. 19, 1999, pp. 126-130.
PowerPoint Presentation: "ECOLAB® Aramark Uniform Services Joining Forces for Service Excellence," 1998, (Applicant points out, in accordance with MPEP 609.04(a), that the year of publication, 1998, is sufficiently earlier than the effective U.S. filing date, so that the particular month of publication is not in issue.) 69 pp.
"ProGiene System Description for UL and CE Mark Approval," UltraClenz, Feb. 8, 2002, 5 pp.
Quattrin, Md, et al., "Application of Hazard Analysis Critical Control Points to Control Surgical Site Infections in Hip and Knee Arthroplasty," Orthopedics 31:132, 6 pp., Feb. 2008, SLACK Incorporated.
SaferCorp, LLC, "SaferCorp Life Advantage Solutions presents SaferHands™ Hospital Automated Hand Hygiene Monitoring System", retrieved electronically from http://www.guardianics.com/ on Dec. 15, 2010, 14 pp.
SaferCorp, LLC, Guardian™ Automated Infection Control Systems (GAICS), Feb. 6, 2010, 4 pp.
Sahud et al., "An Electronic Hand Hygiene Surveillance Device: A Pilot Study Exploring Surrogate Makers for Hand Hygiene Compliance," Infection Control and Hospital Epidemiology, vol. 31, No. 6, Jun. 2010, 6 pp.
Sample Reports, NOVALINK™ System., Jan. 1996, 9 pp.
Sample Reports, Nova Controls, Oct. 1997, 8 pp.
Sax et al., "My five moments for hand hygiene: a user-centered design approach to understand, train, monitor and report hand hygiene," Journal of Hospital Infection, vol. 67, Aug. 27, 2007, pp. 9-21.
Semmelweis, "The Etiology, Concept, and Prophylaxis of Childbed Fever," The University of Wisconsin Press, 1983 (Applicant points out, in accordance with MPEP 609.04(a), that the year of publication, 1983, is sufficiently earlier than the effective U.S. filing date, so that the particular month of publication is not in issue.) 14 pp.
Steed et al., "Hospital Hand Hygiene Opportunities: Where and When (HOW2)? The HOW2 Benchmark Study," American Journal of Infection Control, vol. 39, Feb. 2011, 8 pp.
Sturman et al., "Cornell University Hospitality Report: A New Method for Measuring Housekeeping Performance Consistency," CHR Reports, vol. 6, No. 11, Sep. 2006, 15 pp.
Swedberg, "RFID-based Hand-Hygiene System Prevents Health-Care Acquired Infections," RFID Journal, Jun. 10, 2010, 2 pp.
Swoboda et al., "Electronic Monitoring and Voice Prompts Improve Hand Hygiene and Decrease Nosocomial Infections in an Intermediate Care Unit," Crit Care Med, vol. 32, No. 2, 2004 (Applicant

(56) References Cited

OTHER PUBLICATIONS points out, in accordance with MPEP 609.04(a), that the year of publication, 2004, is sufficiently earlier than the effective U.S. filing date, so that the particular month of publication is not in issue.) pp. 358-363.

Taylor, An Evaluation of Handwashing Techniques-1, Nursing Times, vol. 74, Jan. 12, 1978, pp. 54-55.

Thompson et al., "Handwashing and Glove Use in a Long -Term-Care Facility," Infection Control and Hospital Epidemiology, vol. 18, No. 2, Feb. 1997, pp. 97-103.

Tibballs et al., "Teaching Hospital Medical Staff to Handwash," The Medical Journal of Australia, vol. 164, No. 7, Apr. 1, 1996, pp. 395-398.

T-JET™ 2000 PC, "Wash-Aisle Productivity Manager Software Guide," ECOLAB® Textile Care Division, undated, 2000 (Applicant points out, in accordance with MPEP 609.04(a), that the year of publication, 2000, is sufficiently earlier than the effective U.S. filing date, so that the particular month of publication is not in issue.) 29 pp.

Tsai et al., "iMAT: Intelligent Medication Administration Tools," Aug. 2010, 8 pp.

Van Ryzin et al., "Measuring Street Cleanliness: A Comparison of New York City's Scorecard and Results from a Citizen Survey," Public Administration Review 68(2), Mar./Apr. 2008, pp. 295-303.

Watanakunakorn et al., "An Observational Study of Hand Washing and Infection Control Practices by Healthcare Workers," Infection Control and Hospital Epidemiolgy, vol. 19, No. 11, Nov. 1998, pp. 858-860.

"WHO Guidelines on Hand Hygiene in Health Care," World Health Organization, 2009 (Applicant points out, in accordance with MPEP 609.04(a), that the year of publication, 2009, is sufficiently earlier than the effective U.S. filing date, so that the particular month of publication is not in issue.) 270 pp.

"WHO Guidelines on Hand Hygiene in Health Care (Advanced Draft)," World Health Organization, Apr. 2006, 216 pp.

Yoshikura, "Workflow from Clean to Dirty, HACCP and Inclusiveness Principles in Effective Implementation of Hospital Infection Control," Jpn. J. Infect. Dis. 53, Jun. 6, 2000, 2 pp.

Zuhlsdorf et al., "Cleaning Efficacy of Nine Different Cleaners in a Washer-Disinfector Designed for Flexible Endoscopes," Journal of Hospital Infection, vol. 52, Oct. 9, 2002, pp. 206-211.

Prosecution History from U.S. Appl. No. 12/787,064, dated Dec. 6, 2012, through Apr. 8, 2013, 20 pp.

Prosecution History from U.S. Appl. No. 14/819,349, dated Apr. 5, 2019, 23 pp.

Prosecution History from U.S. Appl. No. 12/683,666, dated Aug. 21, 2012, through Apr. 17, 2013, 36 pp.

"Hygiene Connect," Initial UK, retrieved from https://www.initial.co.uk/hygiene-connect/ on Jun. 18, 2019, 2 pp.

U.S. Appl. No. 14/819,349, filed Aug. 5, 2015, by Tokhtuev et al.

Final Office Action from U.S. Appl. No. 14/819,349, dated Oct. 9, 2019, 32 pp.

Amendment in Response to Office Action dated Apr. 5, 2019, from U.S. Appl. No. 14/819,349, filed Aug. 27, 2019, 20 pp.

\* cited by examiner

FIG. 6

HAND HYGIENE COMPLIANCE MONITORING

TECHNICAL FIELD

The disclosure relates to monitoring of hand hygiene compliance.

BACKGROUND

The practice of proper hand hygiene has been recognized as an effective way to reduce pathogen transmission in settings such as the health care and food service industries. Hands are one of the main pathways for germ transmission during health care food preparation activities. Despite this, compliance with hand hygiene practices remains low, and improvement efforts tend to lack sustainability. Measuring adherence to hand hygiene practices is therefore important, both to identify where hand hygiene compliance is low, and to determine how compliance may be improved.

However, measuring worker adherence to hand hygiene guidelines is not a simple matter. There is no standardized measure for collecting and reporting rates of hand hygiene compliance. Different organizations may require very different hand hygiene practices. For example, both how and when hand hygiene hand should be performed may vary widely depending upon the type of establishment. In addition, even within an organization, hand hygiene requirements may vary depending upon a person's job role and their likelihood of coming into contact with, and/or transmitting, pathogens.

SUMMARY

In general, the disclosure relates to systems and associated processes that monitor hand hygiene compliance. For example, the hand hygiene compliance system may monitor, analyze and report on hand hygiene compliance after activation of a toilet or a urinal.

In one example, the disclosure is directed to a system that monitors hand hygiene compliance at a facility, comprising an activation sensor module that senses activation of a toilet/urinal and transmits corresponding activation event data including an activation sensor identifier and a date and time associated with the sensed activation of the toilet/urinal, the activation event data identifying an associated hand hygiene opportunity; a dispenser actuation sensor module that senses actuation of a hand hygiene product dispenser and transmits corresponding dispense event data including a dispenser actuation sensor identifier and a date and time associated with the sensed actuation of the hand hygiene product dispenser; and a computing device that receives the activation event data and the dispense event data and determines whether the hand hygiene opportunity was compliant with one or more hand hygiene compliance rules, the compliance rules including a predetermined period of time within which actuation of the hand hygiene product dispenser must occur subsequent to the sensed activation of the toilet/urinal in order for the computing device to determine that the hand hygiene opportunity is compliant.

The system may further include a plurality of dispenser actuation sensors, each associated with a different one of a plurality of hand hygiene product dispensers located throughout a facility, the compliance rules further including an association between the activation sensor module and at least one of the plurality of hand hygiene product dispensers, such that actuation of at least one of the associated dispensers must occur within the predetermined period of time subsequent to the sensed activation of the toilet/urinal in order for the computing device to determine that the hand hygiene opportunity is compliant.

The system may further include a plurality of activation sensor modules, each associated with a different one of a plurality of toilet/urinals. The association between the activation sensor module and the at least one of the plurality of hand hygiene product dispensers may be based on their installation in the same restroom.

The remote computing system may further include a reporting application that generates reports concerning hand hygiene compliance at the facility. The remote computing system may further permit users to remotely request and receive the reports. The remote computing system may generate a compliance score according to the equation:

$$\% \text{ Hand Hygiene Compliance} = \frac{\text{Hand Hygiene Opportunities} \times 100}{\text{Compliant Hand Hygiene Events}}.$$

The hand hygiene product dispenser may dispense any one of a hand soap, a hand sanitizer, a hand rub, or an aqueous solution. The hand hygiene product dispenser may dispense any one of a liquid, a gel, a lotion, or a foam.

The system may further comprise a compliance badge including a badge module that stores badge identification data uniquely associated with a user, and that communicates the badge identification data to the toilet/urinal activation sensor upon, wherein the toilet/urinal activation sensor stores the badge identification data as part of the activation event data and the dispenser actuation sensor module stores the badge identification data as part of the dispenser data. The compliance rules may include a predetermined period of time within which actuation of the hand hygiene product dispenser associated with the badge identification data must occur subsequent to the sensed activation of the toilet/urinal associated with the badge identification data in order for the computing device to determine that the hand hygiene opportunity is compliant.

In another example, the disclosure is directed to a system that monitors hand hygiene compliance at a facility, comprising an activation sensor module that senses activation of a toilet/urinal and transmits corresponding activation event data including an activation sensor identifier and a date and time associated with the sensed activation of the toilet/urinal, the activation event data identifying an associated hand hygiene opportunity; a dispenser actuation sensor module that senses actuation of a hand hygiene product dispenser and transmits corresponding dispense event data including a dispenser actuation sensor identifier and a date and time associated with the sensed actuation of the hand hygiene product dispenser; and a computing device that receives the activation event data and the dispense event data and determines whether the dispense event occurred within a predetermined period of time of the activation event to determine whether the hand hygiene opportunity was a compliant hand hygiene opportunity.

The computing device may further associate the toilet/urinal with one or more hand hygiene product dispensers based on the toilet/urinal and the one or more hand hygiene product dispensers being located in the same restroom, and may further determine whether the dispense event occurred at one of the one or more associated hand hygiene product dispensers to determine whether the hand hygiene opportunity was a compliant hand hygiene opportunity.

The remote computing system may generate a compliance score based on the activation event data and the dispense event data. The remote computing system may generate the compliance score according to the equation:

$$\% \text{ Hand Hygiene Compliance} = \frac{\text{Hand Hygiene Opportunities} \times 100}{\text{Compliant Hand Hygiene Events}}.$$

The system may further include a plurality of toilet/urinal activation modules, each uniquely associated with a different one of a plurality of toilet/urinals; a plurality of dispenser actuation modules, each uniquely associated with a different one of a plurality of hand hygiene product dispensers, and the computing device further determines a compliance score based on a plurality of activation events received from the toilet/urinal activation modules and based on a plurality of dispense events received from the dispenser actuation modules.

The compliance score may be determined on a per toilet/urinal basis, a per hand hygiene product dispenser basis, a per restroom basis, a department basis, a facility-wide basis, or a corporate-wide basis. The compliance score may be determined based on a time period, a workday shift, a day, a week, a month, or a year.

The predetermined period of time may be based at least in part on a distance between the toilet/urinal and the hand hygiene product dispenser. The predetermined period of time may be based at least in part on dimension of a room in which the toilet/urinal and the hand hygiene dispenser are located. The predetermined period of time may be based at least in part on a number of hand hygiene product dispensers. The predetermined period of time may be based at least in part on preferred hand hygiene practices of the facility.

In another example, the disclosure is directed to a method of monitoring hand hygiene compliance at a facility, comprising sensing activation of a toilet/urinal and transmitting corresponding activation event data including an activation sensor identifier and a date and time associated with the sensed activation of the toilet/urinal, the activation event data identifying an associated hand hygiene opportunity; sensing actuation of a hand hygiene product dispenser and transmitting corresponding dispense event data including a dispenser actuation sensor identifier and a date and time associated with the sensed actuation of the hand hygiene product dispenser; associating, by a computing device, the toilet/urinal with one or more hand hygiene product dispensers based on the toilet/urinal and the one or more hand hygiene product dispensers being located in the same restroom; and determining, the computing device, whether the hand hygiene opportunity was a compliant hand hygiene opportunity, including determining, by the computing device, whether the dispense event occurred within a predetermined period of time of the activation event; and determining, by the computing device, whether the dispense event occurred at one of the one or more associated hand hygiene product dispensers.

The method may further comprise generating a report concerning hand hygiene compliance at the facility, wherein the report includes a comparison of hand hygiene opportunities and compliant hand hygiene opportunities at the facility over time to determine whether improvement in hand hygiene practices has occurred. The method may further comprise generating a report including hand hygiene data at multiple facilities.

The method may further comprise receiving, by the computing device, first badge identification data that uniquely identifies a first one of a plurality of users from a first compliance badge associated with the activation event; receiving, by the computing device, second badge identification that uniquely identifies a second one of a plurality of users from a second compliance badge associated with the dispense event; comparing, by the computing device, the first badge identification data with the second badge identification data; and determining, by the computing device, whether the hand hygiene opportunity was a compliant hand hygiene opportunity if the first badge identification data matches the second badge identification data.

The details of one or more examples are set forth in the accompanying drawings and the description below. Other features and advantages will be apparent from the description and drawings, and from the claims.

BRIEF DESCRIPTION OF DRAWINGS

FIG. 6 is a chart including example toilet/urinal activation data, example dispenser actuation data, and example results of an analysis to monitor hand hygiene compliance.

DETAILED DESCRIPTION

Figure 1:
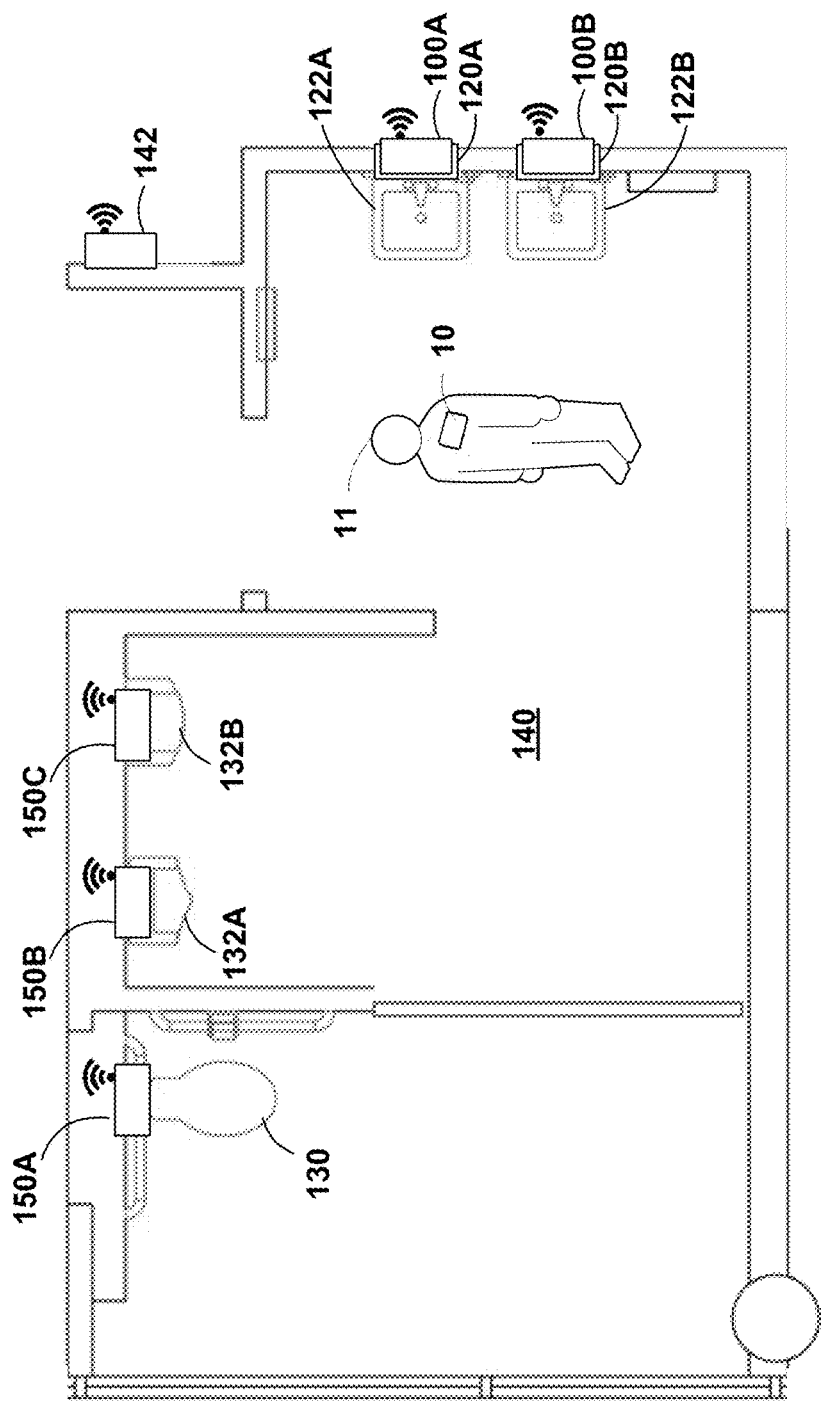
FIG. 1 is a diagram of an example restroom including example toilet/urinal activation sensors and example hand hygiene product dispenser actuation sensors.

In general, the disclosure relates to a system and associated processes that monitor hand hygiene compliance. For example, the hand hygiene compliance system may monitor, analyze and report on compliance with hand hygiene practices after usage of bathroom facilities. In some examples, the system provides a relatively non-intrusive way to measure and improve employee hand hygiene processes that does not involve identification of individual users, requires no added personal hardware, and fits within normal employee use patterns. In other examples, the system includes compliance badges for identification and monitoring of an individual user's hand hygiene practices.

For purposes of the present disclosure, usage of bathroom facilities is determined by sensing activation (e.g., flushing) of a toilet or a urinal. Each sensed activation defines a corresponding toilet/urinal activation event, or simply, activation event. Sensing flushing of a toilet/urinal helps to ensure that the system accurately captures the high-risk events in a bathroom where potential transmission of pathogens is relatively higher, as compared to relatively lower risk events, such as a user merely entering a bathroom to wash their hands before or after lunch, to brush their teeth, or to comb their hair.

Upon sensing an activation event, the system of the present disclosure determines whether the activation event is followed by performance of a compliant hand hygiene procedure. Performance of a hand hygiene procedure is determined by, for example, sensing actuation of a manual or automatic hand hygiene product dispenser. Each sensed dispenser actuation defines a corresponding dispenser actuation event, or simply, dispense event.

Activation of a toilet or a urinal may be automatic or manual. In one example, to detect automatic activation of a toilet/urinal, the system may receive a signal associated with activation of the toilet/urinal from an automatic or touchless toilet/urinal flushing device. In another example, to sense manual activation of a toilet/urinal, the system may receive a sensed signal associated with flushing of a toilet/urinal from a sensor that senses mechanical movement of the toilet flush lever/handle, a water level sensor in the toilet tank, a sensor on the fill or flush valve, a sensor associated with the toilet tank float or float arm, or other mechanism for sensing flushing of a toilet/urinal, such as a tilt sensor, vibration sensor, acoustic sensor, or other type of sensor.

In either case, each toilet/urinal activation event further gives rise to a hand hygiene opportunity. Each hand hygiene opportunity should be followed by a corresponding hand hygiene procedure in order for the hand hygiene opportunity to be deemed "compliant". To determine whether a hand hygiene opportunity is compliant, the system includes one or more sets of compliance rules that define compliant and non-compliant hand hygiene opportunities. For example, the compliance rules may define a predetermined period of time within which a dispense event must follow an activation event in order to determine the hand hygiene opportunity to be compliant. In other words, to determine whether a hand hygiene opportunity is compliant, the system may determine whether a dispenser actuation event occurred within a predetermined period of time from the toilet/urinal activation event. If a dispenser actuation event is sensed within the predetermined period of time, the hand hygiene opportunity is determined to be "compliant". If a dispenser actuation event does not occur within the predetermined period of time from the activation event, the hand hygiene opportunity is determined to be "non-compliant."

In some examples, the compliance rules may further associate each toilet/urinal with one or more hand hygiene product dispensers, and only actuation of one of the associated dispensers within a predetermined period of time will result in a compliant hand hygiene procedure. For example, one or more toilets/urinals and one or more hand hygiene product dispensers may be associated with each other due to their being installed in the same restroom or other area of concern. In this way, only usage of one of the associated hand hygiene dispensers within the predetermined period of time will result in a compliant hand hygiene procedure. This may help to identify when usage of bathroom facilities, such as a toilet or a urinal, is not followed by performance of a compliant hand hygiene procedure before a user leaves the restroom or other area of concern.

In some examples, a plurality of compliance badges are uniquely assigned to each of a plurality of users whose hand hygiene practices are to be monitored. Upon sensing of an activation event and/or dispense event, badge identification information is obtained from the badge and associated with the activation event and/or dispense event. In this way, individual compliance/non-compliance with hand hygiene procedures may be monitored and analyzed.

In some examples, the predetermined period of time may be defined differently for different situations. For example, the predetermined period of time within which a dispense event must follow an activation event may be customized for each toilet/urinal based on one or more factors. For example, the predetermined period of time for hand hygiene opportunity generated from a toilet activation may be different than the predetermined period of time for a hand hygiene opportunity generated from a urinal activation. As another example, the predetermined period of time may be adjusted for each individual toilet/urinal based on the size (dimensions) of the restroom, the distance between a toilet or urinal from the associated hand hygiene product dispensers, the number of toilets/urinals in a restroom, or other factor affecting the amount of time a user should be reasonably given to perform a compliant hand hygiene procedure following usage of bathroom facilities. The acceptable predetermined time frame between hygiene signal and wash signal will may be tuned, for example, by bathroom size and by a statistical analysis of the activation event data and the dispense event data and devising a cut-off related a confidence interval around the mean time between flush and wash, or it may be determined via a machine learning algorithm. Different compliance rules may therefore apply to different toilets and/or urinals, depending upon one or more of these factors.

Upon sensing each toilet/urinal activation event, an activation sensor may store a data record of the activation event, including an associated time stamp identifying the date and time of the activation. The activation event data may further include a toilet/urinal identifier, an activation sensor device identifier, a restroom/location identifier, a facility identifier, and/or any other information pertinent to the activation event. In examples where compliance badges are used, the activation event data may include a badge/user identifier. The activation sensors may further include communication capability that enables the activation sensors to connect and exchange data with one or more local or remote computing devices. For example, each activation sensor may include a wired or wireless transmitter/receiver by which it may transmit the activation event data to one or more local and/or remote computing devices for further analysis and reporting. The activation sensors may further receive operating setting data, software updates, or requests from the one or more local and/or remote computing devices via the wired or wireless transmitter/receiver. The communications may occur through one or more wired or wireless local or wide area network(s), the internet, a mobile phone network, or other means of inter-device connectivity. The activation sensors may further include communication capability that enables the activation sensors to connect and exchange data with one or more compliance badges. For example, each activation sensor may include a wireless short-range transmitter/receiver by which it may communicate with and receive badge identification data from one or more compliance badges within range of the activation sensor.

Similarly, upon sensing each hand hygiene dispenser actuation, a dispenser actuation sensor may store a data record of the dispense event, including an associated time stamp identifying the date and time of the dispenser actuation. The dispense event data may further include a dispenser identifier, an actuation sensor identifier, a location identifier, a facility identifier, and/or any other information pertinent to the dispenser actuation event. In examples where compliance badges are used, the dispense event data may include a badge/user identifier. The dispenser actuation sensors may further include communication capability that enables the sensors to connect and exchange data with one or more local or remote computing devices. For example, each dispenser actuation sensor may include a wired or wireless transceiver by which it may transmit the dispense event data to one or more local and/or remote computers for further analysis and reporting. The actuation sensors may further receive operating setting data, software updates, or requests from the one or more local and/or remote computing devices via the wired or wireless transmitter/receiver. The communications may occur through one or more wired or wireless local or wide area network(s), the internet, a mobile phone network, or other means of inter-device connectivity. The dispenser actuation sensors may further include communication capability that enables the dispenser actuation sensors to connect and exchange data with one or more compliance badges. For example, each dispenser actuation sensor may include a wireless short-range transmitter/receiver by which it may communicate with and receive badge identification data from one or more compliance badges within range of the dispenser actuation sensor.

Transmission of the activation event data and/or the dispense event data by the activation sensors and the dispenser actuation sensors to the local or remote computing devices may be wired or wireless. The communications may further occur in real-time, such as upon detection of each activation event and/or dispense event. The communications may alternatively or in addition occur at defined periodic times or time intervals, and/or may be on demand upon request of a local or remote computing device.

The analysis and/or reporting performed by the local and/or remote computing systems may be performed in real-time, on a periodic basis, or on demand upon receipt of a request from a user computing device.

The hand hygiene product dispensers may include any type of manual or automatic (i.e., touchless, touch free, or hands free) hand hygiene product dispenser that dispense any type of hand hygiene product intended for cleansing, disinfecting, or sanitizing of the hands. Such hand hygiene products may include hand soaps, hand sanitizers, hand rubs, alcohol-based hand rubs, aqueous scrubs, or any other type of hand hygiene product. The hand hygiene products may be in the form of a liquid, a gel, a lotion, a foam, a solution, or any other form of hand hygiene product.

In some examples, the system as a whole may include a plurality of toilet/urinal activation sensors, each associated with a different one of a plurality of toilets/urinals. The system may further include a plurality of dispenser actuation sensors, each associated with a different one of a plurality of hand hygiene product dispensers. Each toilet/urinal activation sensor may be further associated with one or more of the plurality of dispenser actuation sensors. The system may further include a plurality of compliance badges, each uniquely associated with a different one of a plurality of users. However, it shall be understood that the system need not necessary include compliance badges. In some applications, for example, monitoring and analysis of identified individual hand hygiene compliance is not desired.

The system may, either locally or remotely (or both), analyze the toilet/urinal activation event data from the activation sensors and the dispense event data from the dispenser actuation sensors to monitor, measure, and/or generate reports on hand hygiene compliance after usage of bathroom facilities.

The system may generate one or more measures of hand hygiene compliance. In one example, the system may measure and report a hand hygiene compliance score based on the activation event data and the dispense event data. In some examples, the hand hygiene compliance score may be based on the following:

$$\% \text{ Hand Hygiene Compliance} = \frac{\text{Hand Hygiene Opportunities} \times 100}{\text{Compliant Hand Hygiene Events}}$$

Example hand hygiene compliance scores may be determined on a per toilet/urinal basis, a per dispenser basis, a per restroom basis, a department basis, a facility-wide basis, corporate-wide basis, or other location-based measure. In examples where compliance badges are used, hand hygiene compliance scores may be determined on a per user or per compliance badge basis. Example hand hygiene compliance scores may also be determined by time period, workday shift, day, week, month, or other time-based measure. It shall be understood, however, that other measures of hand hygiene compliance may also be used, and that the disclosure is not limited in this respect. The activation event data, dispense event data, and/or compliance scores may be averaged, combined, or otherwise manipulated to identify where and when hand hygiene compliance is satisfactory or unsatisfactory, to identify trends or patterns, provide benchmarks, or to measure the effect on compliance after implementation of training procedures or changes in hand hygiene practices (such as changes in hand hygiene products dispensed, the type of dispensers used, the number or location of dispensers within a restroom or other area of concern, etc.).

In addition to monitoring hand hygiene practices, collection of the bathroom fixture activation signal may additionally provide the opportunity to trigger a cleaning message after a defined number of sensed activations. It may also serve to normalize worker hours and/or soap usage when combined with a dispense signal from a hand hygiene product dispenser thereby creating a way to standardize scores for other connected fixtures in a facility.

In some examples, the hand hygiene compliance information collected and generated is anonymous; that is, the individual worker or employee performing a toilet/urinal activation and/or a hand hygiene dispenser actuation is not identified. In other examples, the system may also include worker identification methods such as electronic compliance badges, and the employee/user data may also be collected and analyzed in the hand hygiene compliance system as described herein.

FIG. 1 is a block diagram illustrating an example restroom 140 installed for hand hygiene compliance monitoring after usage of bathroom facilities according to the present disclosure. Example restroom 140 includes several standard bathroom fixtures including a toilet 130, two urinals 132A and 132B, two sinks 122A and 122B and two hand hygiene product dispensers 120A and 120B. Each toilet/urinal is associated with a toilet/urinal activation sensor, referred to generally as a toilet/urinal activation sensor module 150. For example, toilet 130 is associated with activation sensor module 150A, urinal 132A is associated with activation sensor module 150B, and urinal 132B is associated with activation sensor module 150C. Each hand hygiene product dispenser 120 is associated with a dispenser actuation sensor module 100. For example, hand hygiene product dispenser 120A is associated with dispenser actuation sensor module 100A and hand hygiene product dispenser 120B is associated with dispenser actuation sensor 100B. The hand hygiene product dispensers 120 may, but need not necessarily have, a one-to-one correspondence with sinks 122.

In some examples, compliance badges 10 are worn or carried by users or employees, such as user 11, of the facility in which hand hygiene compliance is to be monitored. The badges 10 are capable of short-range wireless communication with the dispensers 120, the dispenser actuation modules 100, and/or the toilet/urinal activation sensor modules 150 in order to monitor and track hand hygiene compliance of individual users at the facility.

Each activation sensor module 150 senses activation (e.g., flushing) of the respective toilet or urinal. In some examples, each activation sensor module 150 is connected to receive an activation signal from an automatic toilet flushing device installed on the respective toilet/urinal. In those examples, the activation sensors 150 are able to make use of signals generated by automatic flushing devices that are already installed in many commercial bathrooms. In other examples, each activation sensor module 150 is connected to receive an activation signal from manual activation sensor, such as a sensor that senses mechanical movement of the toilet flush lever/handle, a water level sensor in the toilet tank, a sensor on the fill or flush valve, a sensor associated with the toilet tank float or float arm, or other mechanism for sensing flushing of a toilet/urinal, such as a tilt sensor, vibration sensor, acoustic sensor, or other type of sensor.

The automatic toilet flushing device may be implemented using a customized or commercially available automatic toilet flushing device.

Each activation sensor module 150 may include an internal memory or data storage device. Upon sensing of a toilet/urinal activation event, an activation sensor module 150 may store a data record of the activation event, including an associated time stamp identifying the date and time of the activation. The activation event data may further include a toilet/urinal identifier, an activation sensor device identifier, a restroom/location identifier, a facility identifier, and/or any other information pertinent to the activation event. For example, activation sensor module 150A may store an activation event including an activation event identifier or event number, an identifier uniquely assigned to toilet 130, a sensor identifier uniquely associated with activation sensor module 150A, a restroom identifier uniquely associated with restroom 140, a facility identifier uniquely associated with the building, restaurant, healthcare facility or other location identifier in which restroom 140 is located.

In examples where users wear or carry compliance badges 10, the activation sensor module 150 may further include short range wireless communication capability that enables the activation sensor module 150 to communicate with the compliance badge 10 within range of the activation sensor module. In such examples, upon sensing of a toilet/urinal activation event, activation sensor 150 may wirelessly communicate with a compliance badge 10 within range of the toilet/urinal activation sensor, receive badge identification data or user identification data from the badge 10, associate the badge identification data with the activation event, and store the user and/or badge identification data as part of the activation event data.

Figure 2:
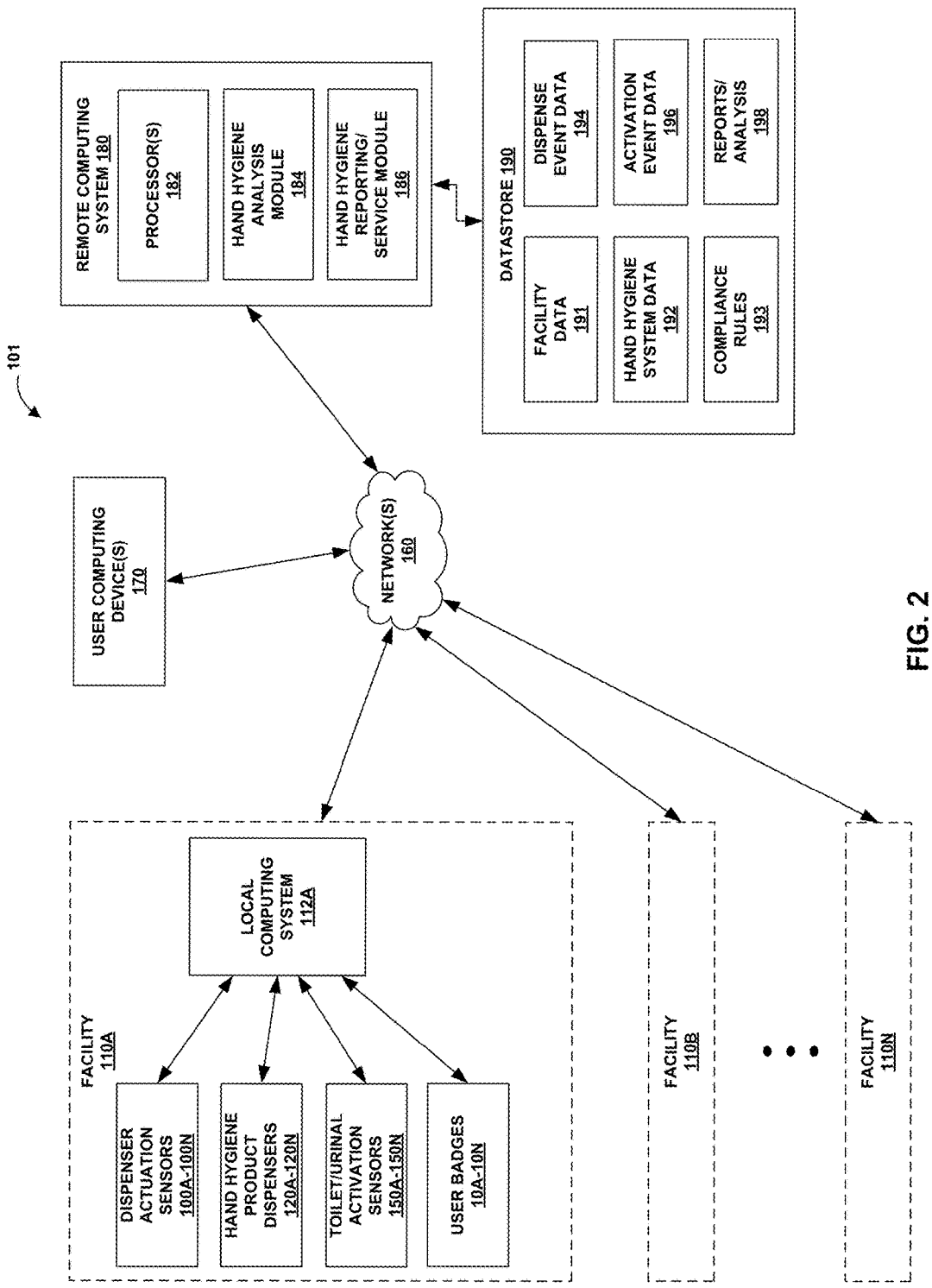
FIG. 2 is a block diagram illustrating an example hand hygiene compliance system.

Each activation sensor module 150 may further include communication capability that enables activation sensor module 150 to connect and exchange data with one or more local or remote computing devices (see, e.g., FIG. 2). For example, each activation sensor module 150 may include a wired or wireless transmitter/receiver by which it may transmit the activation event data to one or more local and/or remote computing devices for further analysis and reporting. The activation sensors may further receive operating setting data, software updates, or requests from the one or more local and/or remote computing devices via the wired or wireless transmitter/receiver. The communications may occur through one or more wired or wireless local or wide area network(s), the internet, a mobile phone network, or other means of inter-device connectivity. The activation event data and other transmissions to and from devices 150A-150C may be routed through one or more wired or wireless network hubs or repeaters, such as device 142, or through other existing local network infrastructure, before being transmitted to one or more local or remote computing devices for analysis.

Each dispenser actuation sensor module 100 senses manual of automatic actuation of the respective hand hygiene product dispenser. In some examples, each actuation sensor module 100 is connected to receive an actuation signal from an automatic (i.e., touchless, touch free, or hands free) hand hygiene product dispenser. In other examples, each actuation sensor module 100 is connected to receive an actuation signal from manual actuation sensor, such as a sensor that senses mechanical movement of a dispenser pushbar or button, mechanical movement of a pump or portions of a pump, or other mechanism for sensing manual actuation of hand hygiene product dispenser.

Each actuation sensor module 100 may include an associated memory or data storage device. Upon sensing of a dispense event, an actuation sensor module 100 may store a data record of the actuation event, including an associated time stamp identifying the date and time of the dispenser actuation. The actuation event data may further include a dispense event identifier or number, a dispenser identifier, an activation sensor device identifier, a restroom/location identifier, a facility identifier, and/or any other information pertinent to the activation event. For example, actuation sensor module 100A may store in its associated memory or data storage device actuation event data including an actuation event identifier or event number, an identifier uniquely assigned to dispenser 120A, an sensor identifier uniquely associated with dispenser actuation sensor module 100A, a restroom identifier uniquely associated with restroom 140, a facility identifier uniquely associated with the building, restaurant, healthcare facility or other location identifier in which restroom 140 is located, or other information pertinent to the dispense event.

In examples where users wear or carry compliance badges 10, the dispenser actuation sensor module 100 may further include short range wireless communication capability that enables the dispenser actuation sensor module 100 to communicate with compliance badge 10 within range of the activation sensor module. In such examples, upon sensing of a dispenser actuation event, dispenser actuation sensor module 100 may wirelessly communicate with a compliance badge 10 within range of the dispenser actuation sensor, receive badge identification data or user identification data from the badge 10, associate the badge identification data with the dispense event, and store the user and/or badge identification data as part of the dispense event data.

Each actuation sensor module 100 may further include communication capability that enables actuation sensor module 100 to connect and exchange data with one or more local or remote computing devices (see, e.g., FIG. 2). For example, each actuation sensor module 100 may include a wired or wireless transmitter/receiver by which it may transmit the actuation event data to one or more local and/or remote computing devices for further analysis and reporting. The actuation sensors may further receive operating setting data, software updates, or requests from the one or more local and/or remote computing devices via the wired or wireless transmitter/receiver. The communications may occur through one or more wired or wireless local or wide area network(s), the internet, a mobile phone network, a satellite network, or other means of inter-device connectivity. The actuation event data and other transmissions to and from devices 100A-100C may be routed through one or more wired or wireless network hubs or repeaters, such as device 142, or through other existing local network infrastructure, before being transmitted to one or more local or remote computing devices for analysis.

In accordance with the present disclosure, each toilet/urinal activation event detected by the system will be identified as a hand hygiene opportunity. The system further determines whether each identified hand hygiene opportunity is followed by a corresponding compliant hand hygiene procedure. For example, in an application that does not utilize compliance badges, assume an employee enters restroom 140 and uses toilet 130, which includes an automatic (i.e., touchless, touch free, or hands free) flushing device. The automatic flushing device generates an activation signal to automatically flush the toilet in accordance with a predetermined method. The toilet activation signal generated by the toilet 130 automatic flushing device is also received by the activation sensor module 150A, which determines that an activation event has occurred, and stores the activation event data including a time stamp including the date and time at which the activation signal was received, an activation event number, the identifier corresponding to toilet 130, the identifier corresponding to activation sensor module 150A, an identifier corresponding to the bathroom 140, etc. In systems including compliance badges, upon receiving the toilet activation signal, the activation sensor module would initiate short range wireless communication to locate and receive compliance badge identification data from any compliance badges within range of the activation sensor module. The activation event data stored by the activation sensor module 150A would include the badge identification data received from the employee's compliance badge.

To determine whether the hand hygiene opportunity associated with the employee's use of toilet 130 is compliant, the system determines whether a dispenser actuation event at one of dispensers 120A or 120B within the restroom 140 occurred within a predetermined period of time from the toilet/urinal activation event. If a dispenser actuation event at one of dispensers 120A or 120B is sensed by dispenser actuation sensors 100A or 100B, respectively, within the predetermined period of time, the hand hygiene opportunity identified by the activation of toilet 130 is determined to be "compliant". If the dispenser actuation sensors 100A or 100B do not detect a dispenser actuation event at either dispenser 120A or 120B, respectively, within the predetermined period of time from the activation event, the hand hygiene opportunity is determined to be "non-compliant." In systems where compliance badges are not used, the system may determine whether a dispenser actuation occurred within the predetermined period of time. In systems where compliance badges are used, the system may determine whether a dispenser actuation corresponding to the same badge identification data occurred within the predetermined period of time of the toilet/urinal activation.

In this example, each toilet/urinal 130, 132A and 132B may be associated with hand hygiene product dispensers 120A and 120B by virtue of their installation in the same restroom, and only actuation of one of the associated dispensers within a predetermined period of time will result in a compliant hand hygiene procedure. In this way, only usage of one of the associated hand hygiene dispensers within the predetermined period of time will result in a compliant hand hygiene procedure. This may help to ensure that a compliant hand hygiene procedure is performed before a user leaves the restroom 140 whenever an activation event is detected at one of the toilets 130 or urinals 132A, 132B within the restroom 140.

In some examples, the predetermined period of time may be defined differently for different situations. For example, the predetermined period of time within which a dispense event must follow an activation event may be customized for each toilet/urinal based on one or more factors. For example, the predetermined period of time for a hand hygiene opportunity generated from an activation event at toilet 130 may be different than the predetermined period of time for a hand hygiene opportunity generated from an activation event at urinal 132A and/or urinal 132B. This may be due at least in part to the different amounts of time in which a user may reasonably be expected to wash their hands after usage of a toilet as compared to usage of a urinal. The differing predetermined period(s) of time may further be due at least in part to the physical layout of the bathroom and the resulting different distances between a first bathroom fixture (e.g., toilet or urinal) and an associated hand hygiene product dispenser and the distance between a second bathroom fixture (e.g., toilet or urinal) and an associated hand hygiene product dispenser. This may further be due at least in part to the habits of the users of the restroom and/or any required bathroom or handwashing procedures of the workplace. In some examples, the predetermined period of time may be customized or adjusted for each individual toilet/urinal based on the size (dimensions) of the restroom, the physical layout of the restroom, the distance between a toilet or urinal from the associated hand hygiene product dispensers, the number of toilets/urinals in a restroom, or other factor affecting the amount of time a user should be reasonably given to perform a compliant hand hygiene procedure following usage of bathroom facilities.

For example, a predetermined amount of time for a compliant hand hygiene procedure (dispense event) may be between 10-120 seconds after sensing of a toilet activation event, whereas a predetermined amount of time for a compliant hand hygiene procedure (dispense event) may be 3-90 seconds after sensing of a urinal activation event. However, it shall be understood that these time frames are given for purposes of example only, and that the amounts of time may be adjusted and customized according to the factors discussed herein, and that the disclosure is not limited in that respect.

FIG. 2 is a block diagram illustrating an example hand hygiene compliance system 101 in accordance with the present disclosure. One or more facilities 110A-110N, such health care facilities, restaurants, or food processing facilities, are each associated with a local computing system, such as local computing system 112A, that is in communication, via network 160, with a remote computing system 180 and one or more user computing device(s) 170. Although certain features of system 100 are shown and described herein as being performed by remote computing system 180, in other examples, the features and techniques attributed to system remote computing system 180 may be performed internally, by local components of local computing systems 112A-112N, or by remote user computing device(s) 170.

Each facility 110A-110N includes an associated local computing system 112A-112N, respectively. Each facility, such as facility 110A, further includes one or more hand hygiene product dispensers 120A-120N, each associated with one of a plurality of dispenser actuation sensors 100A-100N. Each facility further includes a plurality of toilet/urinal activation sensors 150A-150N, each associated with one of a plurality of toilets or urinals within the facility, as shown in FIG. 1. In some examples, each facility further includes a plurality of compliance badges 10A-10N, each uniquely associated with a different one of a plurality of users.

Remote computing system 180 includes one or more processors 182, a hand hygiene analysis module 184, and a hand hygiene reporting module 186. A data store 190 may be local or a remotely located from the remote computing system 180, and includes data storage for facility data 191, hand hygiene system data 192, compliance rule data 193, dispenser data 194, activation data 196, and reports/analysis data 198. Hand hygiene analysis module 184 includes programmed instructions that, when executed by one or more processors 182, analyze the toilet/urinal activation event data generated by the activation sensors 150A-150N and the dispense event data generated by the dispenser actuation sensors 120A-120N to monitor compliance with established hand hygiene procedures after usage of bathroom facilities. Hand hygiene reporting/service module 186 includes instructions that, when executed by the one or more processors 182, provide a hand hygiene compliance monitoring service, thus providing the results of the analysis performed under direction of the analysis module 184, to user computing devices 170 or to the local computing systems 112A-112N.

Facility data 191 includes data concerning each of facilities 110A-110N, such as the name of the facility; the type of facility (e.g., restaurant, healthcare facility, food processing facility, etc.); location information such as address, city, state, and zip code; employee information; management information; accounting information; business information; information concerning those persons or entities authorized to access the reports generated by the hand hygiene compliance system; and any other pertinent facility data that may be used or generated by the remote computing system 180 during performance of the hand hygiene compliance analysis or providing access to the hand hygiene compliance monitoring service.

Hand hygiene system data 192 includes data concerning the physical and virtual set up of the various devices and sensors that make-up the hand hygiene compliance monitoring systems in each location 110A-110N. For example, hand hygiene system data 192 includes identification and other relevant information (such as dispenser type, location, dispensed product name; dispensed product type (e.g., sanitizer, soap, alcohol, etc.); dispensed product form (solid, liquid, gel, foam, etc.); dispensed product amounts (by volume, weight, or other measure)), etc. for each of the hand hygiene product dispensers 120A-120N; identification and other relevant information for each of the dispenser actuation sensors 100A-100N; and identification and other relevant information for each of the toilet/urinal activation sensors 150A-150N at each location 110A-110N. The hand hygiene system data 192 may also include any of the following: data uniquely associating each dispenser 120A-120N with one of dispenser actuation sensors 100A-100N; data uniquely associating each dispenser 120A-120N, dispenser actuation sensor 100A-100N, and activation sensors 150A-150N with a specific room within a facility 110; data associating each activation sensor module 150A-150N with one or more specific ones of the dispensers 120A-120N and/or dispenser actuation sensors 100A-100N; data defining the predetermined period of time within which a compliant hand wash procedure must be performed for each of the toilet/urinal activation sensors 150A-150N; and any other hand hygiene system information that may be used or generated by the hand hygiene analysis module during performance of the hand hygiene compliance analysis or by the hand hygiene reporting module while providing access to the hand hygiene compliance monitoring service. In examples where compliance badges are used, hand hygiene system data 192 may include assigned compliance badge identification data uniquely associated with each employee or user in the system for which hand hygiene compliance is to be monitored and/or analyzed.

Compliance rules 193 include one or more sets of rules used by computing system 180 during analysis of the activation event data and the dispense event data to determine whether a hand hygiene opportunity is compliant. The compliance rules define compliant and non-compliant hand hygiene opportunities. The sets of compliance rules may be different depending upon the factors described herein, such as the number and type of toilets/urinals in a restroom, the preferred hand hygiene practices of the establishment or facility, the dimensions or layout of the restroom, the habits of the employees of the establishment, whether or not compliance badges are implemented in the particular system, etc. Each toilet/urinal in a facility is therefore associated with one of the sets of compliance rules for determining whether a compliant hand hygiene procedure was performed. The compliance rules may include, for example, identifiers for one or more associated dispensers at which a compliant dispense event may take place and a predetermined period of time in which a dispense event at an associated dispenser must take place in order for an activation at the toilet/urinal to be compliant.

Dispense event data 194 stores the dispense event records received from dispenser actuation sensors 100A-100N from each facility 110A-110N. The dispense event data may include but is not limited to a time stamp identifying the date and time of the dispenser actuation, a dispenser identifier, a dispenser actuation sensor identifier, a location (e.g., restroom) identifier, a facility identifier, and/or any other information pertinent to the dispenser actuation event. In systems employing compliance badges, the dispense event data may further include badge identification data received from a compliance badge within range of the dispenser actuation sensor module at the time of the dispense event.

Activation event data 196 stores all of the activation event records received from toilet/urinal activation sensors 150A-150N from each facility 110A-110N. The activation event data may include but is not limited to a time stamp identifying the date and time of the activation event, a toilet/urinal identifier, a toilet/urinal activation sensor identifier, a location (e.g., restroom) identifier, a facility identifier, and/or any other information pertinent to the toilet/urinal activation event. In systems employing compliance badges, the activation event data may further include badge identification data received from a compliance badge within range of the toilet/urinal activation sensor module at the time of the activation event.

Reports/analysis data 198 stores some or all of the results of analysis executed by hand hygiene analysis module 184 and/or hand hygiene reporting/service module 186. Reports may be generated, for example, during provision of a hand hygiene compliance monitoring service under control of reporting/service module 186 to authorized employees at one or more of the facilities 110A-110N. For example, a user working from a user computing device 170 (which may be local to or remotely located from the facility itself) may access the hand hygiene compliance monitoring service provided by remote computing system 180 and reporting/service module 186 to request hand hygiene compliance reports that provide detailed information and analysis of the hand hygiene compliance at the one or more facilities 110A-110N. Access to the hand hygiene compliance monitoring service may be accessed via a username and password, and any reports generated may be associated with the user and stored as reports 198 for future access.

Network 160 represents any public or private communications network, for instance, cellular, Wi-Fi, and/or other types of wired or wireless networks, for transmitting data between computing systems, servers, and computing devices. Local computing systems 112A-112N, remote user computing devices 170 and/or remote computing system 180 may exchange data, via network 160, with each other to provide a hand hygiene compliance monitoring service that is accessible to local computing system 112A-112N and/or remote user computing devices 170 when such computing systems and devices are connected to network 160.

Network 160 may include one or more network hubs, network switches, network routers, repeaters, or any other network equipment, that are operatively inter-coupled thereby providing for the exchange of information between systems/computing devices 112, 170 and 180. Local computing system 112A-112N, user computing devices 170, and remote computing system 180 may transmit and receive data across network 160 using any suitable communication techniques. Local computing systems 112A-112N, user computing devices 170, and remote computing system 180 may each be operatively coupled to network 160 using respective network links. The links coupling local computing systems 112A-112N, user computing devices 170, and remote computing system 180 to network 130 may be Ethernet or other types of network connections and such connections may be wireless and/or wired connections.

Local computing system 160 and remote computing system 180 may represent any suitable computing systems, such as one or more desktop computers, laptop computers, mainframes, servers, cloud computing systems, etc. capable of sending and receiving information both to and from a network, such as network 160. Remote computing system 180 may host (or at least provides access to) a hand hygiene compliance monitoring service. In some examples, remote computing system 180 represents a cloud-based computing system that provides access to their respective services via a cloud computing network.

User computing devices 170 may represent one or more individual mobile or non-mobile computing devices. Examples of a user computing device 170 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant device), a personal digital assistant (PDA), a gaming system, a media player, an e-book reader, a mobile television platform, an automobile navigation or infotainment system, or any other type of mobile, non-mobile, wearable, and non-wearable computing device configured to communicate and receive information via a network, such as network 160.

Remote computing system 180 may communicate with user computing devices 170 and/or devices in the local computing systems 112A-112N via network 160 to give computing devices 170 or local computing systems 112A-112N access to the hand hygiene compliance monitoring service provided by remote computing system 180.

Hand hygiene reporting module 186 may generate a variety of reports that present the analyzed data for use by the person(s) responsible for overseeing hand hygiene compliance at each location or facility 110A-110N. Reporting module 186 may generate a variety of reports to provide users local to each facility 110A-110N or users of remote computing devices 170 with both qualitative and quantitative data regarding hand hygiene compliance at their location or facility, and/or to compare data over time to determine whether improvement has occurred. Reporting module 186 may also allow users to benchmark hand hygiene compliance at multiple facilities.

For example, reporting application 186 may generate one or more reports concerning hand hygiene compliance at the facility. The reports may include a comparison of hand hygiene opportunities and compliant hand hygiene opportunities at the facility over time to determine whether improvement in hand hygiene practices has occurred. Reporting application 186 may also generate one or more reports including hand hygiene opportunity/compliance data at multiple facilities.

Local computing systems 112A-112N (FIG. 1) or an associated datastore may also store the above-described hand hygiene data associated with that facility. Local computing system 112A-112N and/or user computing devices 170 may also include local analysis and reporting applications such as those described above with respect to analysis module 184 and reporting module 186. In that case, reports associated with that particular facility may be generated and viewed locally, if desired. In another example, all analysis and reporting functions are carried out remotely at remote computing system 100, and reports may be requested, accessed, viewed, downloaded or otherwise obtained remotely. In other examples, some of the local computing systems 112A-112N may include local storage and/or analysis and reporting functions while other of the local computing systems 112A-112N may rely on remote storage and/or analysis and reporting. Thus, although the general case of data being stored and analysis/reporting being carried out and provided by the server computing system 180 is described herein, it shall be understood that these storage, analysis and reporting functions may also be carried out locally or at some other location, and that the disclosure is not limited in this respect.

Reporting module 186 may generate many different types of reports and present the raw data and/or the results of the analysis in many different ways during provision of the hand hygiene compliance monitoring service. Reporting module 186 may permit the user to request reports that convey the data in a variety of different ways. For example, reporting module 186 may permit a user to select a particular format (text, graphs, tables, combinations thereof, etc.); select by data type (dispense event data, activation event data, etc.); select by time, time period, or date; select by shift, department, facility or multiple facilities; by percent compliance (for example, to select or rank by highest, lowest or average compliance); or to create and generate reports based on nearly any data collected and stored by hand hygiene compliance system 100. In systems where compliance badges are used, the reporting module 186 may generate reports based on compliance badge identification data or employee identification data; and may permit a user to generate and view hand hygiene compliance data on a per employee/user basis.

These reports may include, for example, detailed analysis and reporting on key metrics, including hand hygiene compliance department, type of department, shift, individual facility, individuals, across multiple facilities, corporate-wide, etc. The reports may benchmark current hand hygiene practices, and may include trending of various key metrics over time, identify particular problem areas (e.g., certain workday shifts, employees, or locations having unsatisfactory hand hygiene compliance) provide actionable improvement plans and assess current practices relative to best hand hygiene practices. Reports may compare highest, lowest and/or average percentage compliance by any of these breakdowns; reports compare highest, lowest and/or average number of dispense events per dispenser. Reports may present trend data showing past, present and projected future hand hygiene compliance.

The reports may indicate whether the number of dispense events per dispenser, per room, per shift, per employee, per department, per facility etc. is within acceptable limits and whether it met specified targets for dispense events for each of these parameters.

The reports may highlight particular problems areas where hand hygiene compliance thresholds are not being met. For example, the reports may identify employees, shifts, departments or facilities having hand hygiene compliance below a specified threshold. This information can help to identify where additional training or corrective action may be necessary.

The reports may also provide a summary of recommended next steps that a facility may take to improve their hand hygiene compliance results in the future. For example, suggested next steps may be given for continuous improvement and education directed toward identified employees, shifts or departments, operational processes, hand hygiene outcome efficiency, etc.

Figure 3:
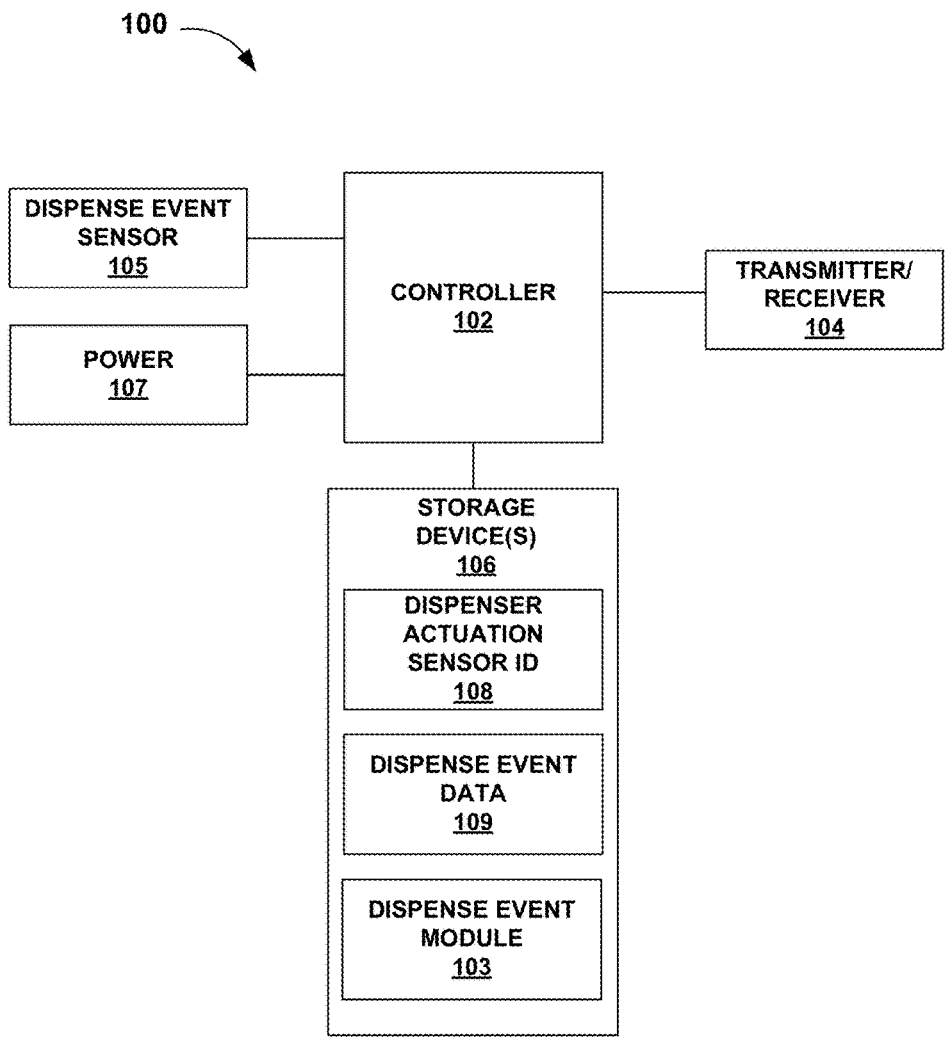
FIG. 3 is a block diagram of an example dispenser actuation sensor for a hand hygiene product dispenser.

FIG. 3 is a block diagram illustrating an example implementation of a dispenser actuation sensor module 100. In this example, dispenser actuation sensor module 100 includes a controller 102, a power source 107, such as one or more batteries, an actuation or dispense event sensor 105, a transmitter/receiver module 104, and a memory or data storage device 106.

A dispense event module 103 stored in memory 106 and executed by controller 102 provides the instructions by which dispense event module 100 senses/receives a dispenser actuation signal from an associated dispenser and stores or transmits the corresponding dispense event data to a local or remote computing device for further analysis.

Dispense event sensor 105 detects actuation of the associated hand hygiene product dispenser. For example, dispense event sensor 105 may be implemented using a mechanical or electronic switch, a photo interrupter, a flex sensor, an acceleration sensor, an IR interrupter, an IR reflectance sensor, or other mechanism for detecting mechanical movement of a dispenser button or bar when manually activated by a user, detecting movement of a dispensing mechanism or pump that causes the hand hygiene product to be dispensed, optically detecting such mechanical movement(s) or optically detecting movement of dispensed product, etc. The dispense event sensor 105 may further be connected to receive one or more signals from an automatic (i.e., touchless, touch free, or hands free) hand hygiene product dispenser that is generated upon detection of presence of a user in close proximity to the dispenser or presence of a user's hands under or in close proximity to the dispenser, and/or that is generated to cause an automatic dispense mechanism or pump to dispense the hand hygiene product in response to detection of presence of the user or the user's hands. In the event of an automatic dispenser, the signal received from the dispenser may include dispenser actuation data including a time stamp for the actuation, a dispenser identifier, and other pertinent dispenser information. Alternatively, the dispenser identifier may be stored by the actuation sensor 100.

Further example automatic hand hygiene product dispensers and/or example dispenser actuation sensor modules are described in U.S. Pat. No. 8,502,680 issued Aug. 6, 2013, U.S. Pat. No. 8,395,515 issued Mar. 12, 2013, U.S. Pat. No. 8,872,665 issued Oct. 28, 2014, U.S. Pat. No. 8,842,406 issued Jul. 9, 2013, U.S. Pat. No. 8,783,511 issued Jul. 22, 2014, U.S. Pat. No. 8,564,431 issued Oct. 22, 2013, U.S. Pat. No. 8,264,343 issued Sep. 11, 2012, U.S. application Ser. No. 14/819,349 filed Aug. 5, 2015, U.S. application Ser. No. 15/406,129 filed Jan. 13, 2017, and U.S. Provisional Application No. 62/468,214 filed Mar. 7, 2017, each of which is incorporated herein by reference in their entirety.

Storage device(s) 106 stores an actuation sensor identifier 108 uniquely associated with actuation sensor module 100. The actuation sensor identifier may also include additional data associated with the actuation sensor module, such as the associated dispenser identifier, location information such as a restroom number or identifier, a facility identifier, etc., or other information that may be included in the dispense event data generated upon sensing of a dispense event.

Storage device(s) 106 further stores dispense event data 109 associated with each detected dispenser actuation event. For example, dispense event data for each dispense event may include a time stamp identifying the date and time of the dispenser actuation, a dispense event identifier or count, a dispenser identifier, an actuation sensor identifier, a location identifier, a facility identifier, and/or any other information pertinent to the dispenser actuation event. For applications in which compliance badges are used, the dispense event data may further include compliance badge identification data obtained from a compliance badge within range of the dispenser module at or near the time of the dispense event.

Transmitter/receiver 104 provides for wireless communication between actuation sensor module 100 and a local computing network. For example, transmitter/receiver 104 may be implemented IR, RF, Wi-Fi, satellite, cellular, Bluetooth, or other wireless communication techniques. However, it shall be understood that other wired or wireless communication modules and/or protocols could be used and that the disclosure is not limited in this respect. Transmitter/receiver 104 may also provide for short-range wireless communication between actuation sensor module 100 and one or more compliance badges 10. In the examples described herein, the short-range wireless communication may include distances of up to a few meters. Such relatively short transmission distances may be accomplished using any type of short-range communication techniques including short-range radio (RF) (e.g., Bluetooth, ZigBee, or ultra-wide band (UWB)) communication, infrared (IR) communication, or near field (NFC) communication techniques.

Controller 102 executes instructions stored in dispense event module 103 that control detection of dispense events, communication with one or more compliance badge(s) 10, and/or communication to and from dispense event sensor module 100 via transmitter/receiver 104. For example, upon receiving each dispenser actuation signal from dispense event sensor 105, controller 102 generates a dispense event record, including corresponding time stamp, dispenser identifier, and/or dispenser actuation sensor module identifier, and stores the dispense event record in dispense event data 109. Controller 102 may further initiate short range wireless communication in an attempt to locate any compliance badges within range of dispenser module 100, receive the associated compliance badge identification data, and store the badge identification data as part of the dispense event data. Dispense event module 103 may transmit dispense event record each time a dispense event occurs, may transmit one or more stored dispense event records on a periodic basis, or may transmit one or more dispense event records upon request from a local or remote computing device.

Figure 4:
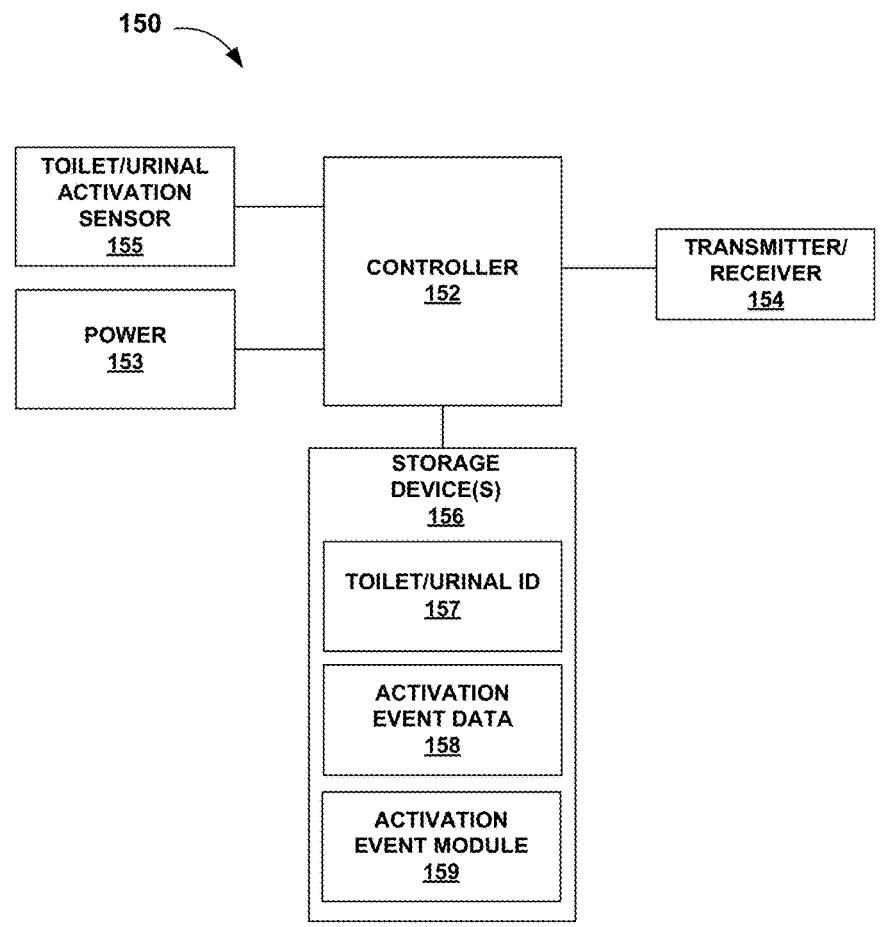
FIG. 4 is a block diagram of an example toilet/urinal activation sensor.

FIG. 4 is a block diagram illustrating an example implementation of a toilet/urinal activation sensor module 150. In this example, toilet/urinal activation sensor module 150 includes a power source 153, such as one or more batteries, an activation event sensor 155, a controller 152, a transmitter/receiver module 154, and a memory or data storage device 156.

An activation event module 159 stored in memory 156 and executed by controller 152 provides the instructions by which activation event module 150 senses/receives a dispenser actuation signal from an associated dispenser and stores or transmits the corresponding dispense event data to a local or remote computing device for further analysis.

Toilet/urinal activation event sensor 155 detects activation (e.g., flushing) of the associated toilet or urinal. For example, activation event sensor 155 may be implemented using a mechanical or electronic switch, or other mechanism for detecting mechanical movement of a toilet lever or handle when manually activated by a user, detecting movement of a toilet float, or sensing the opening or closing of a toilet/urinal flush or fill valve, or by sensing any of the above mechanical motions using a tilt sensor or vibration sensor, or by using an acoustic sensor, etc. In another example, activation event sensor 105 receives an activation signal from an automatic (i.e., touchless, touch free, or hands free) toilet flushing device.

An example automatic toilet flushing unit operates as follows. A typical automatic flushing unit includes a presence sensor that senses when a user enters its effective range. Once a user remains in the effective range for a certain minimum period of time, the unit waits for the user to step away out of the effective range, and will then initiate a flush cycle. Many units allow either the effective range and/or the minimum amount of time to be adjusted. Initiation of the flush cycle includes generation of an electronic activation signal, which may be sensed or received by a toilet/urinal activation sensor module as described herein.

Storage device 156 stores a toilet/urinal activation sensor identifier 157 that uniquely associated with activation sensor module 100. The activation sensor identifier 157 may also include additional data associated with the activation sensor module 100, such as the associated toilet/urinal identifier, a location identifier, or other information that may be included in the activation event data generated upon sensing of a toilet/urinal activation event.

Storage device 156 further stores activation event data 158 associated with each detected toilet/urinal activation event. For example, activation event data for each detected activation event may include a time stamp identifying the date and time of the toilet/urinal activation, an activation event identifier or number, a toilet/urinal identifier, an activation sensor identifier, a location identifier, a facility identifier, and/or any other information pertinent to the activation event. For applications in which compliance badges are used, the activation event data may further include compliance badge identification data obtained from a compliance badge within range of the activation module at or near the time of the activation event.

Transmitter/receiver 154 provides for wireless communication between activation sensor module 150 and a local computing network. For example, transmitter/receiver 154 may be implemented IR, RF, Wi-Fi, satellite, cellular, Bluetooth, or other wireless communication techniques. However, it shall be understood that other wired or wireless communication modules and/or protocols could be used and that the disclosure is not limited in this respect. Transmitter/receiver 154 may also provide for short-range wireless communication between activation sensor module 150 and one or more compliance badges 10. In the examples described herein, the short-range wireless communication may include distances of up to a few meters. Such relatively short transmission distances may be accomplished using any type of short-range communication techniques including short-range radio (RF) (e.g., Bluetooth, ZigBee, or ultra-wide band (UWB)) communication, infrared (IR) communication, or near field (NFC) communication techniques.

Controller 152 executes instructions stored in activation event module 159 that control detection of toilet/urinal activation events and communication to and from activation sensor module 150 via transmitter/receiver 154. For example, upon receiving each toilet/urinal activation signal from activation event sensor 155, controller 152 generates an activation event record, including corresponding time stamp, toilet/urinal identifier, and/or toilet/urinal activation sensor module identifier, and stores the activation event record in activation event data 158. Controller 152 may further initiate short-range wireless communication in an attempt to locate any compliance badges within range of activation sensor module 150, receive the associated compliance badge identification data, and store the badge identification data as part of the activation event data. Activation event module 159 may transmit activation event record each time an activation event occurs, may transmit one or more stored activation event records on a periodic basis, or may transmit one or more activation event records upon request from a local or remote computing device.

Figure 9:
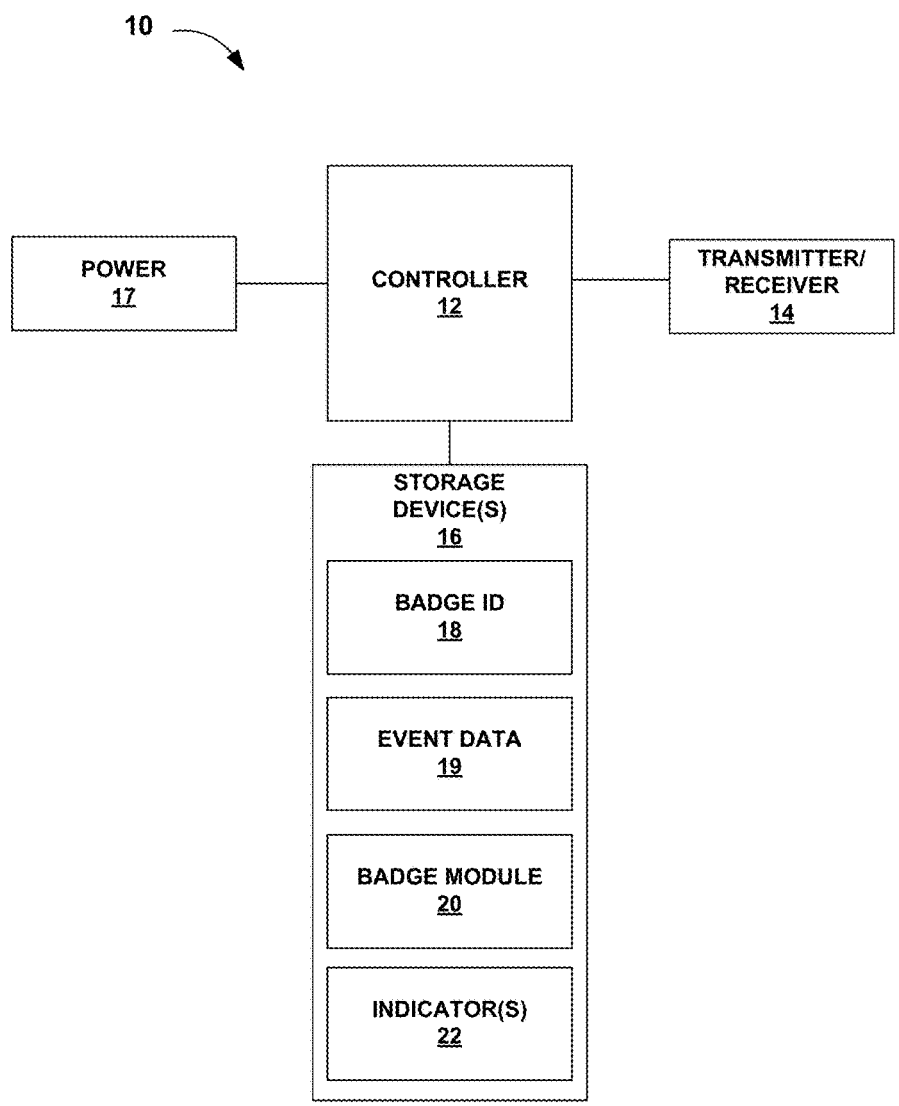
FIG. 9 is a block diagram of an example compliance badge.

FIG. 9 is a block diagram illustrating an example implementation of a compliance badge 10. In this example, compliance badge 10 includes a power source 17, such as one or more batteries, a controller 12, a transmitter/receiver module 14, and one or more data storage device(s) 16. In some examples, compliance badge 10 may be an entirely passive device and therefore not include any type of batteries or power source, or it may include a power source and one or more active elements as shown in FIG. 9. A badge module 20 stored in storage device(s) 16 and executed by controller 12 provides the instructions by which compliance badge 10 communicates with a toilet/urinal activation sensor(s) 150 and/or dispenser actuation module(s) 100. Compliance badge 10 may further include one or more indicators 22. Indicators 22 may include one or more visual indicators or audible indicators that may be activated to communicate or invite a hand hygiene dispense event, indicate when the user has failed to perform a compliant hand hygiene event, or otherwise communicate hand hygiene status.

Transmitter/receiver 14 provides for short-range wireless communication between compliance badge 10 and one or more activation sensor module(s) 150 and/or one or more dispenser modules 100. In the examples described herein, the short-range wireless communication may include distances of up to a few meters. Such relatively short transmission distances may be accomplished using any type of short-range communication techniques including short-range radio (RF) (e.g., Bluetooth, ZigBee, or ultra-wide band (UWB)) communication, infrared (IR) communication, or near field (NFC) communication techniques.

Controller 12 executes instructions stored in badge module 20 that control communication to and from activation sensor module 150 and/or dispenser actuation module 100 via transmitter/receiver 14. For example, upon receiving each toilet/urinal activation signal from activation event sensor 155, controller 152 of activation sensor module 150 transmits a short-range interrogation signal via transmitter/receiver 154 in an attempt to locate a nearby compliance badge 10 with which to associate the dispense event. A badge 10 that is close enough to establish communication via transmitter/receiver 14 with transmitter/receiver 154 will respond to the interrogation signal and short-range communication between compliance badge 10 and activation sensor module 150 is established. Badge module 20 controls communication of the badge identification data 18 stored in storage device(s) 16 of compliance badge 10 to the activation sensor module 150. Upon receipt of badge identification data from the compliance badge 10, activation sensor module 150 associates the badge identification data with the activation event and stores the activation event record in activation event data 158.

Similarly, upon receiving each dispenser actuation signal from dispense event sensor 105, controller 102 of dispenser actuation sensor module 100 transmits a short-range interrogation signal via transmitter/receiver 104 in an attempt to locate a nearby compliance badge 10 with which to associate the dispense event. A badge 10 that is close enough to establish communication via transmitter/receiver 14 with transmitter/receiver 104 will respond to the interrogation signal and short-range communication between compliance badge 10 and dispenser actuation sensor module 100 is established. Badge module 20 controls communication of the badge identification data 18 stored in storage device(s) 16 of compliance badge 10 to dispenser actuation sensor module 100. Upon receipt of badge identification data from the compliance badge 10, dispenser actuation sensor module 100 associates the badge identification data with the dispense event data and stores the activation event record in storage device(s) 156 in dispense event data 109.

Figure 5:
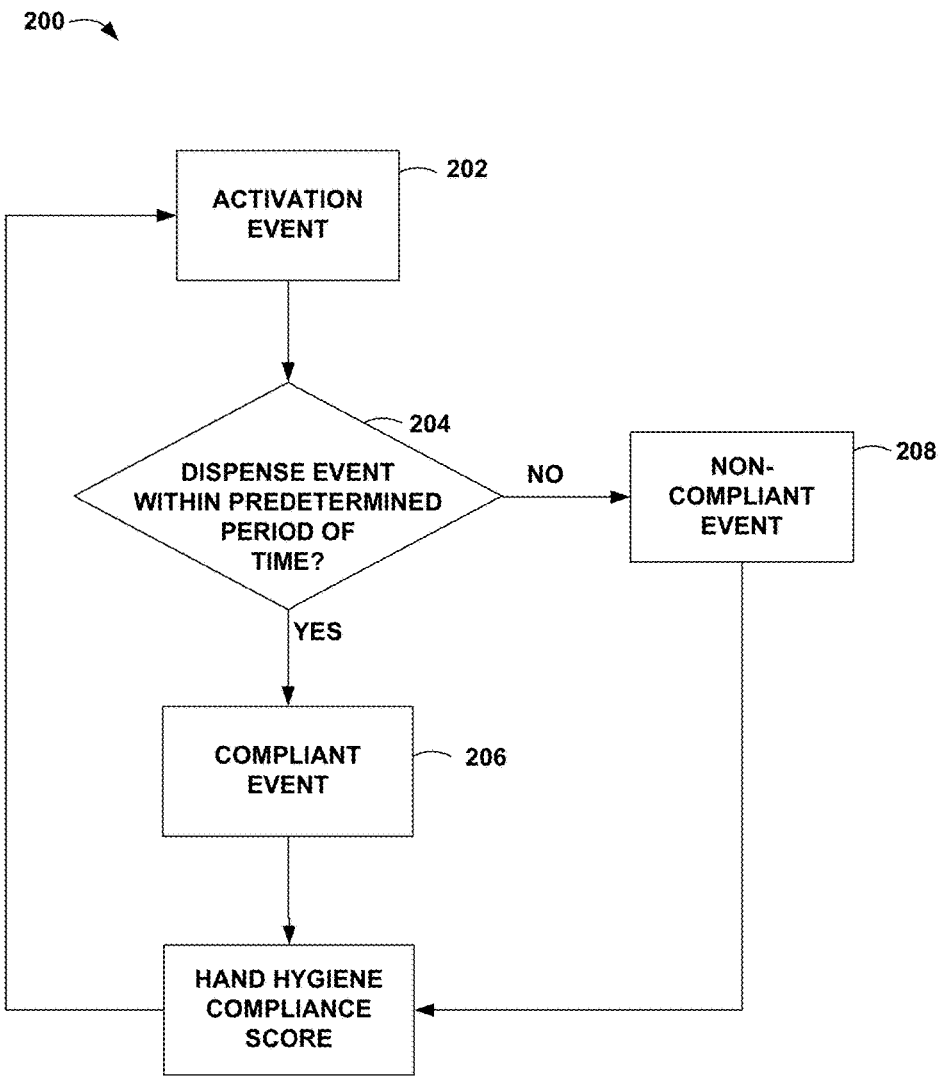
FIG. 5 is a flow chart illustrating an example process by which a computing device may analyze toilet/urinal activation data and dispenser actuation data to monitor hand hygiene compliance.

FIG. 5 is a flowchart illustrating a process by which a computing device, such as processors 182 remote computing system 180, determine whether a toilet/urinal activation event was followed by performance of a compliant hand washing procedure. For each toilet/urinal activation event (202), the computing device reviews determines whether any subsequent dispense events occurred at an associated hand hygiene product dispenser within the relevant predetermined period of time (204). If so, the activation/dispense is deemed to be a compliant hand hygiene event (206). If no such dispense event occurred within the relevant predetermined period of time, the toilet/urinal activation is determined to be noncompliant (208).

In some examples, if compliance badges are implemented, detection of an activation event (202) may further include receipt of compliance badge identification data uniquely identifying the compliance badge associated with the activation event. Similarly, in such examples, detection of a dispense event (204) may further include may further include receipt of compliance badge identification data uniquely identifying the compliance badge associated with the dispense event. For each toilet/urinal activation event (202) and associated compliance badge identification data, the computing device reviews determines whether any subsequent dispense events occurred at an associated hand hygiene product dispenser that were associated with matching compliance badge identification data within the relevant predetermined period of time (204). This is to ensure that the hand hygiene dispense event was associated with the same compliance badge (and thus, the same employee or user) with which the toilet/urinal activation event was associated. If so, the activation/dispense is deemed to be a compliant hand hygiene event (206). If no such dispense event with a matching compliance badge identification data occurred within the relevant predetermined period of time, the toilet/urinal activation is determined to be noncompliant (208).

The computing device may further determine a hand hygiene compliance score (210). In one example, the computing device determines the compliance score according to the equation:

$$\% \text{ Hand Hygiene Compliance} = \frac{\text{Hand Hygiene Opportunities} \times 100}{\text{Compliant Hand Hygiene Events}}$$

Example hand hygiene compliance scores may be determined for each toilet/urinal activation event, on a per toilet/urinal basis, a per dispenser basis, a per restroom basis, a department basis, a facility-wide basis, corporate-wide basis, or other location-based measure. Example hand hygiene compliance scores may also be determined by time period, workday shift, day, week, month, or other time-based measure. It shall be understood, however, that other measures of hand hygiene compliance may also be used, and that the disclosure is not limited in this respect. In examples where compliance badges are implemented, hand hygiene compliance scores may further be determined by employee, employee type, department, shift, facility, or other manner of grouping employees and their associated hand hygiene data.

Using the restroom 140 of FIG. 1 as an example, assume a worker uses urinal 132B, resulting in generation of a toilet/urinal activation event signal by toilet/urinal activation sensor module 150C. Assume for purposes of this example that the system does not make use of compliance badges. The worker then dispenses hand hygiene product using dispenser 120B, resulting in generation of a dispense event signal by dispenser actuation module 100B. To determine whether performance of the hand hygiene procedure at dispenser 120B was compliant (ref. num. 204 of FIG. 5), processor(s) 182 may compare the time stamp for the activation event with the time stamp for the dispense event to determine whether the dispense event occurred within the predetermined period of time from the activation event. Processor(s) 182 would further determine whether the dispenser 120B and/or the dispenser actuation sensor module 100B are associated with urinal 132B and/or toilet/urinal activation sensor module 150C. If both of these are answered in the affirmative, processor(s) 182 would determine that the urinal activation event was followed by a compliant hand hygiene dispense event. However, if the dispense event did not occur at an associated dispenser until after the predetermined period of time had elapsed, or if no dispense event occurred, the urinal activation event would be determined to be non-compliant. Similarly, if a dispense event occurred within the predetermined period of time but it did not occur at one of the dispensers associated with the toilet/urinal, the urinal activation would be determined to be non-compliant.

In another example using the restroom 140 of FIG. 1 as an example, assume a worker 11 wearing or carrying an associated compliance badge 10 uses urinal 132B, resulting in generation of a toilet/urinal activation event signal by toilet/urinal activation sensor module 150C. During and shortly following activation of toilet/urinal 132B, worker 11 is close enough to activation sensor module 150C such that activation sensor module 150C can establish short-range communication with compliance badge 10, and receives the compliance badge identification data from compliance badge 10. The worker then dispenses hand hygiene product using dispenser 120B, resulting in generation of a dispense event signal by dispenser actuation module 100B. During and shortly following actuation of dispenser 120B, worker 11 is close enough to actuation sensor module 100B such that actuation sensor module 100B can establish short-range communication with compliance badge 10, and receives the compliance badge identification data from compliance badge 10. To determine whether performance of the hand hygiene procedure at dispenser 120B was compliant (ref num. 204 of FIG. 5), processor(s) 182 may compare the time stamp for the activation event with the time stamp for the dispense event to determine whether the dispense event occurred within the predetermined period of time from the activation event. Processor(s) 182 would further determine whether the dispenser 120B and/or the dispenser actuation sensor module 100B are associated with urinal 132B and/or toilet/urinal activation sensor module 150C. Processor(s) 182 would further compare the badge identification data associated with the dispense event with the badge identification data associated with the toilet/urinal activation event. If all of these are answered in the affirmative, processor(s) 182 would determine that the urinal activation event was followed by a compliant hand hygiene dispense event (206). However, if the dispense event did not occur at an associated dispenser until after the predetermined period of time had elapsed, or if no dispense event occurred, the toilet/urinal activation event would be determined to be non-compliant (208). Similarly, if a dispense event occurred within the predetermined period of time but it did not occur at one of the dispensers associated with the toilet/urinal, or if the badge identification data did not match, the urinal activation would be determined to be non-compliant (208).

Figure 6:
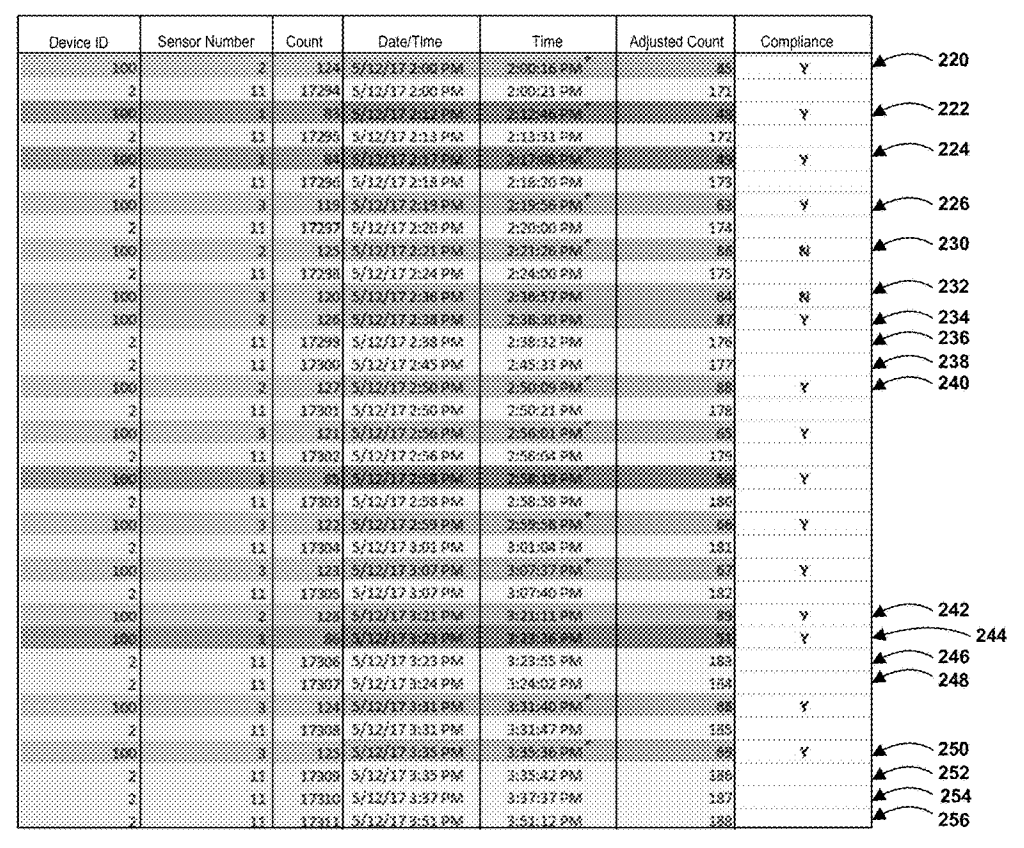

FIG. 6 is a table showing toilet/urinal activation event data and dispense event data for an example individual restroom. Compliance badge data is not shown in this example. The restroom includes a single toilet having a uniquely associated toilet activation sensor denoted by Sensor Number 1 (or simply, Sensor 1). The restroom also includes two urinals having uniquely associated activation sensors denoted by Sensor 2 and Sensor 3. The restroom further includes one hand hygiene product dispenser having a uniquely associated dispenser actuation sensor denoted by Sensor 11. The Device ID indicates whether the device in question is a toilet/urinal, which are denoted in this example by Device ID 100, or a hand hygiene product dispenser, which are denoted in this example by Device ID 2. Different types of hand hygiene product dispensers may be given different Device ID numbers. Likewise, toilets/urinals may be given different Device ID numbers in different examples.

In this case, because the toilet, urinals, and dispenser are in the same restroom, they are associated with each other in the sense that dispense events occurring at dispenser Sensor 11 may result in a compliant hand wash if they occur within the predetermined period of time of activation events detected by any one of sensors Sensor 1, Sensor 2, or Sensor 3. In other words, for example, the Sensor 1, Sensor 2 and Sensor 3 may be associated in memory with Sensor 11 at the remote computing system 180 of FIG. 2, and these associations may be stored in hand hygiene system data 192, which stores the information concerning the number and identification of each fixture (toilet, urinal) and hand hygiene product dispenser in a restroom, department, building, facility and/or corporation, and also stores information concerning which fixtures are associated with each other for purposes of identifying compliant and/or non-compliant hand hygiene opportunities.

The row labeled "Count" includes an absolute count of the total number of activations or actuations that have occurred since the sensor was installed. Thus, for example, in the first row, Sensor 2 has sensed a total of 124 urinal activations since it was installed. In row 2, Sensor 11 has sensed a total of 17,294 dispenser actuations since it was installed. The row labeled "Adjusted Count" may include, for example, the total activations or actuations that have been sensed so far in a particular time period. For example, the Adjusted Count may be reset to zero at midnight (or other defined time) each day, so that the Adjusted Count records the total number of activations/actuations sensed so far that day.

The far-right column indicates whether the toilet/urinal activation event recorded in that row were compliant (Y) or non-compliant (N). For example, the activation event detected at a urinal associated with Sensor 2 recorded in the first row of the table as indicated by reference numeral 220 was determined to be compliant, as indicated by the Y in the far-right column of that row. This is because a compliant dispense event at a hand hygiene product dispenser associated with Sensor 11 occurred at time 2:00:21 PM, which is 15 seconds after the activation event time stamp of 2:00:16 PM, which in this example is within the acceptable predetermined period of time (assuming, for purposes of this example that the predetermined period of time for a compliant dispense event is 3-120 seconds after a urinal activation). Similarly, the activation events recorded in rows indicated by reference numerals 222, 224, and 226 were also followed by compliant dispense events.

The activation event at row 230, which was detected at Sensor 2 at time 2:21:26 PM, is followed by a dispense event detected at Sensor 11 at time 2:24:00 PM. This is 2 minutes and 34 seconds (154 seconds) after the activation event, which is outside the predetermined period of time (assuming, for purposes of this example, that the predetermined period of time for a compliant dispense event is 5-120 seconds after a toilet activation). Thus, the activation event at row 230 is determined to be non-compliant as denoted by the N in the far-right column of row 230.

The activation event at row 232 is not followed by a dispense event within the predetermined period of time, and is therefore non-compliant.

The activation at row 234 which occurred at time 2:38:30 PM is followed by a dispense event 236 occurring at time 2:38:32 PM, and is therefore compliant. It is also followed by another dispense event 238 which occurred at time 2:45:33 PM. This dispense event 238 may be due to someone entering the restroom to wash their hands but who did not use the restroom facilities, and because a compliant dispense event was already identified, may be ignored.

The activations at rows 242 and 244 are both determined to be compliant activation events. The activation event at row 242 has a compliant dispense event recorded in row 246 (a time difference of 104 seconds, which is within the acceptable predetermined time limit of 120 seconds in this example), and the activation event at row 244 has a compliant dispense event recorded in row 248 (a time difference of 26 seconds, which is within the acceptable predetermined time limit of 120 seconds in this example).

The activation event recorded at row 250 is followed by a compliant dispense event recorded at row 252 (a time difference of 6 seconds). Additional dispense events are recorded as indicated by reference numerals 256 and 258; however, because a compliant dispense event was already detected, these are not associated with a detected activation event and may be ignored in this example.

Multiple dispenser actuations may also be observed when a user dispense hand hygiene product more than once per wash. However, as long as a dispense event occurs within the predetermined period of time for each activation event, the remaining dispenser actuations may be ignored for purposes of determining whether a toilet/urinal activation event was followed by a compliant dispense event.

Figure 7:
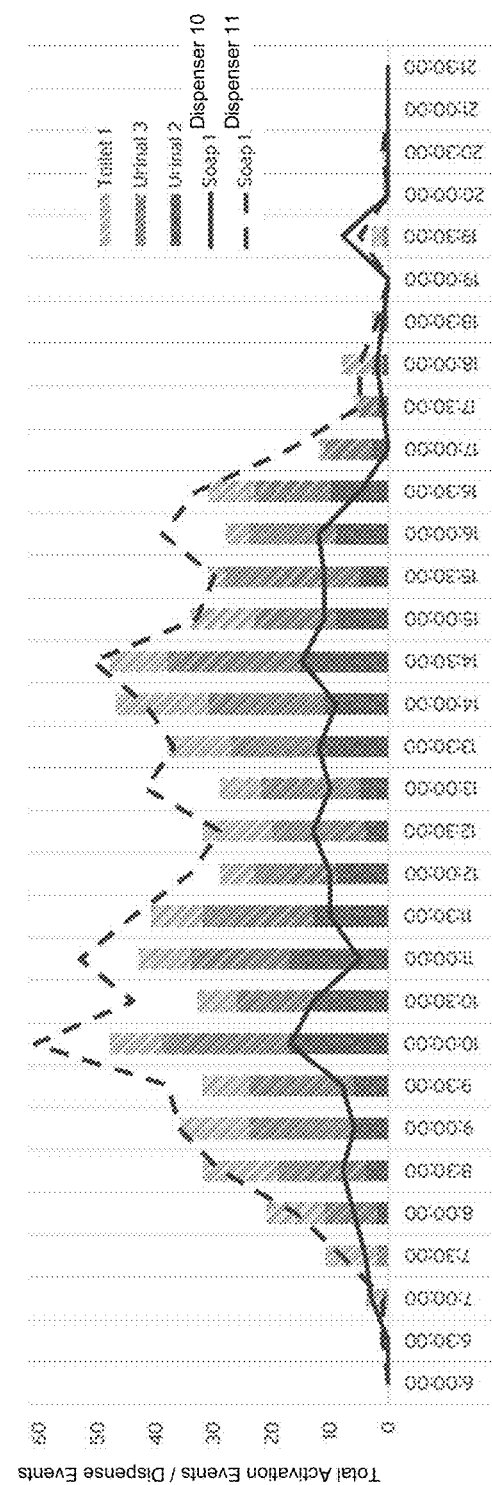
FIG. 7 is an example graph illustrating example toilet/urinal activation data and example dispenser actuation data over the course of one workday period.

FIG. 7 is an example graph showing toilet/urinal activations and dispenser actuation events detected for a particular restroom in 30-minute intervals over the course of a typical workday (in this case, from about 6:00:00 AM to 6:30:00 PM). Compliance badge data is not shown in FIG. 7. This graph shows a general trend of frequency of use during the observed period, during which higher use and lower use times are visible. Insights from this data could provide recommended times for cleaning a facility without too much disruption to traffic flow.

Figure 8:
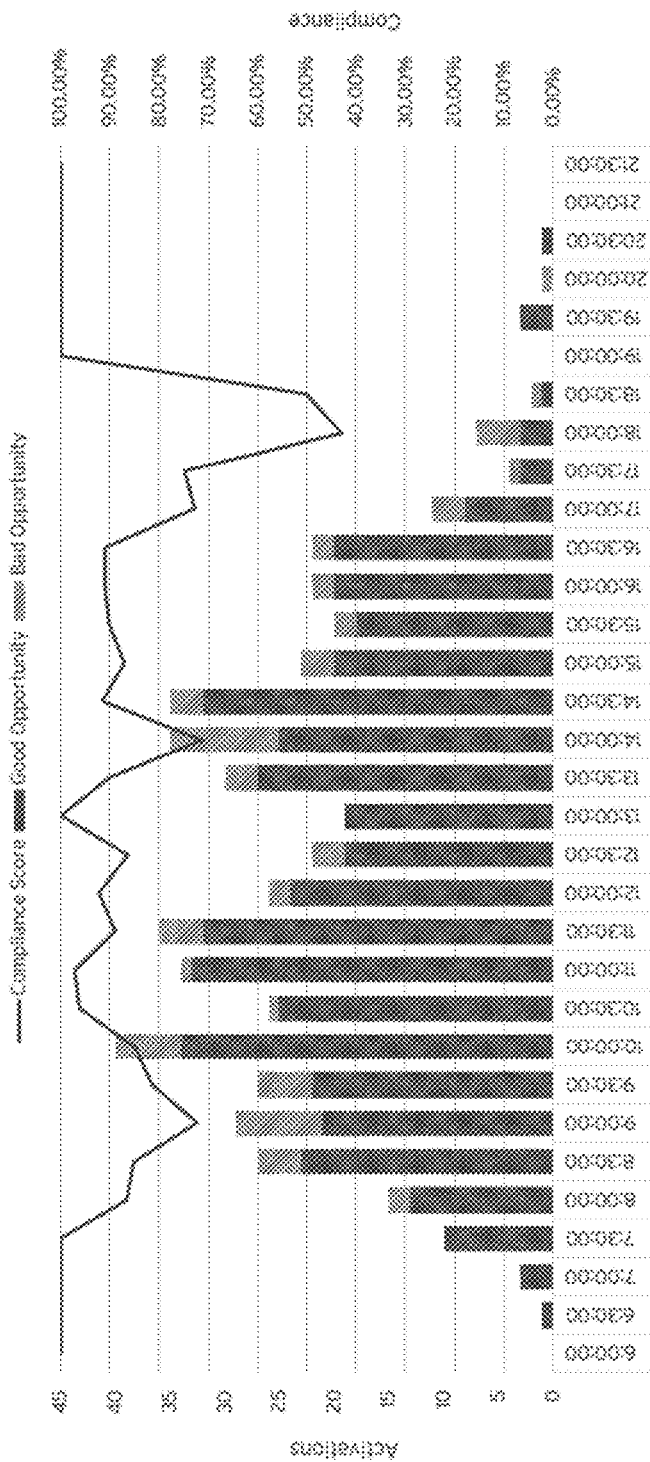
FIG. 8 is an example graph illustrating example compliance scores generated from the example data shown in the graph of FIG. 7.

FIG. 8 is an example graph showing average compliance for each 30-minute interval over the course of a typical work day for the data of FIG. 7. Compliance badge data is not shown in this example. The number compliant or "good" hand hygiene opportunities and the number of non-compliant or "bad" hand hygiene opportunities is also shown for each 30-minute interval. In this example, heavier traffic seemed to result in a dip in compliance, and there is also a drop in compliance at the end of the work day. If the compliance were calculated or averaged over the entire day, the drop in compliance at certain times of day would not be noticed. This data may be used to recommend training sessions for employees that emphasize performance of compliant hand hygiene procedures at certain times of the day to improve compliance at those times of day in the future.

EXAMPLES

Example 1

A system that monitors hand hygiene compliance at a facility, comprising an activation sensor module that senses activation of a toilet/urinal and transmits corresponding activation event data including an activation sensor identifier and a date and time associated with the sensed activation of the toilet/urinal, the activation event data identifying an associated hand hygiene opportunity; a dispenser actuation sensor module that senses actuation of a hand hygiene product dispenser and transmits corresponding dispense event data including a dispenser actuation sensor identifier and a date and time associated with the sensed actuation of the hand hygiene product dispenser; and a computing device that receives the activation event data and the dispense event data and determines whether the hand hygiene opportunity was compliant with one or more hand hygiene compliance rules, the compliance rules including a predetermined period of time within which actuation of the hand hygiene product dispenser must occur subsequent to the sensed activation of the toilet/urinal in order for the computing device to determine that the hand hygiene opportunity is compliant.

Example 2

The system of Example 1, further including a plurality of dispenser actuation sensors, each associated with a different one of a plurality of hand hygiene product dispensers located throughout a facility, the compliance rules further including an association between the activation sensor module and at least one of the plurality of hand hygiene product dispensers, such that actuation of at least one of the associated dispensers must occur within the predetermined period of time subsequent to the sensed activation of the toilet/urinal in order for the computing device to determine that the hand hygiene opportunity is compliant.

Example 3

The system of Example 2, further including a plurality of activation sensor modules, each associated with a different one of a plurality of toilet/urinals.

Example 4

The system of Example 2, wherein the association between the activation sensor module and the at least one of the plurality of hand hygiene product dispensers is based on their installation in the same restroom.

Example 5

The system of Example 1, wherein the remote computing system further includes a reporting application that generates reports concerning hand hygiene compliance at the facility.

Example 6

The system of Example 1, wherein the remote computing system further permits users to remotely request and receive the reports.

Example 7

The system of Example 1, wherein the remote computing system generates a compliance score according to the equation:

$$\% \text{ Hand Hygiene Compliance} = \frac{\text{Hand Hygiene Opportunities} \times 100}{\text{Compliant Hand Hygiene Events}}$$

Example 8

The system of Example 1, wherein the hand hygiene product dispenser dispenses one of a hand soap, a hand sanitizer, a hand rub, or an aqueous solution.

Example 9

The system of Example 1 wherein the hand hygiene product dispenser dispenses one of a liquid, a gel, a lotion, or a foam.

Example 10

The system of Example 1 further comprising a compliance badge including a badge module that stores badge identification data uniquely associated with a user, and that communicates the badge identification data to the toilet/urinal activation sensor upon, wherein the toilet/urinal activation sensor stores the badge identification data as part of the activation event data and the dispenser actuation sensor module stores the badge identification data as part of the dispenser data.

Example 11

The system of Example 10 wherein the compliance rules include a predetermined period of time within which actuation of the hand hygiene product dispenser associated with the badge identification data must occur subsequent to the sensed activation of the toilet/urinal associated with the badge identification data in order for the computing device to determine that the hand hygiene opportunity is compliant.

Example 12

A system that monitors hand hygiene compliance at a facility, comprising an activation sensor module that senses activation of a toilet/urinal and transmits corresponding activation event data including an activation sensor identifier and a date and time associated with the sensed activation of the toilet/urinal, the activation event data identifying an associated hand hygiene opportunity; a dispenser actuation sensor module that senses actuation of a hand hygiene product dispenser and transmits corresponding dispense event data including a dispenser actuation sensor identifier and a date and time associated with the sensed actuation of the hand hygiene product dispenser; and a computing device that receives the activation event data and the dispense event data and determines whether the dispense event occurred within a predetermined period of time of the activation event to determine whether the hand hygiene opportunity was a compliant hand hygiene opportunity.

Example 13

The system of Example 12 wherein the computing device further associates the toilet/urinal with one or more hand hygiene product dispensers based on the toilet/urinal and the one or more hand hygiene product dispensers being located in the same restroom, and further wherein the computing device further determines whether the dispense event occurred at one of the one or more associated hand hygiene product dispensers to determine whether the hand hygiene opportunity was a compliant hand hygiene opportunity.

Example 14

The system of Example 12 wherein the remote computing system generates a compliance score based on the activation event data and the dispense event data.

Example 15

The system of Example 14 wherein the remote computing system generates the compliance score according to the equation:

$$\% \text{ Hand Hygiene Compliance} = \frac{\text{Hand Hygiene Opportunities} \times 100}{\text{Compliant Hand Hygiene Events}}.$$

Example 16

The system of Example 12 further comprising a plurality of toilet/urinal activation modules, each uniquely associated with a different one of a plurality of toilet/urinals; a plurality of dispenser actuation modules, each uniquely associated with a different one of a plurality of hand hygiene product dispensers, and the computing device further determines a compliance score based on a plurality of activation events received from the toilet/urinal activation modules and based on a plurality of dispense events received from the dispenser actuation modules.

Example 17

The system of Example 16 wherein the compliance score is determined on a per toilet/urinal basis, a per hand hygiene product dispenser basis, a per restroom basis, a department basis, a facility-wide basis, or a corporate-wide basis.

Example 18

The system of Example 16 wherein the compliance score is determined based on a time period, a workday shift, a day, a week, a month, or a year.

Example 19

The system of Example 12 wherein the predetermined period of time is based at least in part on a distance between the toilet/urinal and the hand hygiene product dispenser.

Example 20

The system of Example 12 wherein the predetermined period of time is based at least in part on dimension of a room in which the toilet/urinal and the hand hygiene dispenser are located.

Example 21

The system of Example 12 wherein the predetermined period of time is based at least in part on a number of hand hygiene product dispensers.

Example 22

The system of Example 12 wherein the predetermined period of time is based at least in part on preferred hand hygiene practices of the facility.

Example 23

A method of monitoring hand hygiene compliance at a facility, comprising sensing activation of a toilet/urinal and transmitting corresponding activation event data including an activation sensor identifier and a date and time associated with the sensed activation of the toilet/urinal, the activation event data identifying an associated hand hygiene opportunity; sensing actuation of a hand hygiene product dispenser and transmitting corresponding dispense event data including a dispenser actuation sensor identifier and a date and time associated with the sensed actuation of the hand hygiene product dispenser; associating, by a computing device, the toilet/urinal with one or more hand hygiene product dispensers based on the toilet/urinal and the one or more hand hygiene product dispensers being located in the same restroom; and determining, the computing device, whether the hand hygiene opportunity was a compliant hand hygiene opportunity, including determining, by the computing device, whether the dispense event occurred within a predetermined period of time of the activation event; and determining, by the computing device, whether the dispense event occurred at one of the one or more associated hand hygiene product dispensers.

Example 24

The method of Example 23 further comprising generating a report concerning hand hygiene compliance at the facility, wherein the report includes a comparison of hand hygiene opportunities and compliant hand hygiene opportunities at the facility over time to determine whether improvement in hand hygiene practices has occurred.

Example 25

The method of Example 23 further comprising generating a report including hand hygiene data at multiple facilities.

Example 26

The method of Example 23 further comprising receiving, by the computing device, first badge identification data that uniquely identifies a first one of a plurality of users from a first compliance badge associated with the activation event; receiving, by the computing device, second badge identification that uniquely identifies a second one of a plurality of users from a second compliance badge associated with the dispense event; comparing, by the computing device, the first badge identification data with the second badge identification data; and determining, by the computing device, whether the hand hygiene opportunity was a compliant hand hygiene opportunity if the first badge identification data matches the second badge identification data.

Various examples have been described. These and other examples are within the scope of the following claims.

The invention claimed is:

1. A system that monitors hand hygiene compliance at a facility, comprising:
an activation sensor module that senses activation of a toilet/urinal and transmits corresponding activation event data including an activation sensor identifier and a date and time associated with the sensed activation of the toilet/urinal, the activation event data identifying an associated hand hygiene opportunity;
a dispenser actuation sensor module that senses actuation of a hand hygiene product dispenser and transmits corresponding dispense event data including a dispenser actuation sensor identifier and a date and time associated with the sensed actuation of the hand hygiene product dispenser; and
a computing device that receives the activation event data and the dispense event data and determines whether the hand hygiene opportunity was compliant with one or more hand hygiene compliance rules,
the compliance rules including a predetermined period of time within which actuation of the hand hygiene product dispenser must occur subsequent to the sensed activation of the toilet/urinal in order for the computing device to determine that the hand hygiene opportunity is compliant.

2. The system of claim 1, further including a plurality of dispenser actuation sensors, each associated with a different one of a plurality of hand hygiene product dispensers located throughout a facility,
the compliance rules further including an association between the activation sensor module and at least one of the plurality of hand hygiene product dispensers, such that actuation of at least one of the associated dispensers must occur within the predetermined period of time subsequent to the sensed activation of the toilet/urinal in order for the computing device to determine that the hand hygiene opportunity is compliant.

3. The system of claim 2, further including a plurality of activation sensor modules, each associated with a different one of a plurality of toilet/urinals.

4. The system of claim 2, wherein the association between the activation sensor module and the at least one of the plurality of hand hygiene product dispensers is based on their installation in the same restroom.

5. The system of claim 1, wherein the remote computing system further includes a reporting application that generates reports concerning hand hygiene compliance at the facility.

6. The system of claim 1, wherein the remote computing system further permits users to remotely request and receive the reports.

7. The system of claim 1, wherein the remote computing system generates a compliance score according to the equation:

$$\% \text{ Hand Hygiene Compliance} = \frac{\text{Hand Hygiene Opportunities} \times 100}{\text{Compliant Hand Hygiene Events}}$$

8. The system of claim 1, wherein the hand hygiene product dispenser dispenses one of a hand soap, a hand sanitizer, a hand rub, or an aqueous solution.

9. The system of claim 1 wherein the hand hygiene product dispenser dispenses one of a liquid, a gel, a lotion, or a foam.

10. The system of claim 1 further comprising:
a compliance badge including a badge module that stores badge identification data uniquely associated with a user, and that communicates the badge identification data to the toilet/urinal activation sensor upon,
wherein the toilet/urinal activation sensor stores the badge identification data as part of the activation event data and the dispenser actuation sensor module stores the badge identification data as part of the dispenser data.

11. The system of claim 10 wherein the compliance rules include a predetermined period of time within which actuation of the hand hygiene product dispenser associated with the badge identification data must occur subsequent to the sensed activation of the toilet/urinal associated with the badge identification data in order for the computing device to determine that the hand hygiene opportunity is compliant.

12. A system that monitors hand hygiene compliance at a facility, comprising:
an activation sensor module that senses activation of a toilet/urinal and transmits corresponding activation event data including an activation sensor identifier and a date and time associated with the sensed activation of the toilet/urinal, the activation event data identifying an associated hand hygiene opportunity;
a dispenser actuation sensor module that senses actuation of a hand hygiene product dispenser and transmits corresponding dispense event data including a dispenser actuation sensor identifier and a date and time associated with the sensed actuation of the hand hygiene product dispenser; and a computing device that receives the activation event data and the dispense event data and determines whether the dispense event occurred within a predetermined period of time of the activation event to determine whether the hand hygiene opportunity was a compliant hand hygiene opportunity.

13. The system of claim 12 wherein the computing device further associates the toilet/urinal with one or more hand hygiene product dispensers based on the toilet/urinal and the one or more hand hygiene product dispensers being located in the same restroom, and further wherein the computing device further determines whether the dispense event occurred at one of the one or more associated hand hygiene product dispensers to determine whether the hand hygiene opportunity was a compliant hand hygiene opportunity.

14. The system of claim 12 wherein the remote computing system generates a compliance score based on the activation event data and the dispense event data.

15. The system of claim 14 wherein the remote computing system generates the compliance score according to the equation:

$$\% \text{ Hand Hygiene Compliance} = \frac{\text{Hand Hygiene Opportunities} \times 100}{\text{Compliant Hand Hygiene Events.}}$$

16. The system of claim 12 further comprising:
a plurality of toilet/urinal activation modules, each uniquely associated with a different one of a plurality of toilet/urinals;
a plurality of dispenser actuation modules, each uniquely associated with a different one of a plurality of hand hygiene product dispensers,
and the computing device further determines a compliance score based on a plurality of activation events received from the toilet/urinal activation modules and based on a plurality of dispense events received from the dispenser actuation modules.

17. The system of claim 16 wherein the compliance score is determined on a per toilet/urinal basis, a per hand hygiene product dispenser basis, a per restroom basis, a department basis, a facility-wide basis, or a corporate-wide basis.

18. The system of claim 16 wherein the compliance score is determined based on a time period, a workday shift, a day, a week, a month, or a year.

19. The system of claim 12 wherein the predetermined period of time is based at least in part on a distance between the toilet/urinal and the hand hygiene product dispenser.

20. The system of claim 12 wherein the predetermined period of time is based at least in part on dimension of a room in which the toilet/urinal and the hand hygiene dispenser are located.

21. The system of claim 12 wherein the predetermined period of time is based at least in part on a number of hand hygiene product dispensers.

22. The system of claim 12 wherein the predetermined period of time is based at least in part on preferred hand hygiene practices of the facility.

23. A method of monitoring hand hygiene compliance at a facility, comprising:
sensing activation of a toilet/urinal and transmitting corresponding activation event data including an activation sensor identifier and a date and time associated with the sensed activation of the toilet/urinal, the activation event data identifying an associated hand hygiene opportunity;
sensing actuation of a hand hygiene product dispenser and transmitting corresponding dispense event data including a dispenser actuation sensor identifier and a date and time associated with the sensed actuation of the hand hygiene product dispenser;
associating, by a computing device, the toilet/urinal with one or more hand hygiene product dispensers based on the toilet/urinal and the one or more hand hygiene product dispensers being located in the same restroom; and
determining, the computing device, whether the hand hygiene opportunity was a compliant hand hygiene opportunity, including:
determining, by the computing device, whether the dispense event occurred within a predetermined period of time of the activation event; and
determining, by the computing device, whether the dispense event occurred at one of the one or more associated hand hygiene product dispensers.

24. The method of claim 23 further comprising generating a report concerning hand hygiene compliance at the facility, wherein the report includes a comparison of hand hygiene opportunities and compliant hand hygiene opportunities at the facility over time to determine whether improvement in hand hygiene practices has occurred.

25. The method of claim 23 further comprising generating a report including hand hygiene data at multiple facilities.

26. The method of claim 23 further comprising:
receiving, by the computing device, first badge identification data that uniquely identifies a first one of a plurality of users from a first compliance badge associated with the activation event;
receiving, by the computing device, second badge identification that uniquely identifies a second one of a plurality of users from a second compliance badge associated with the dispense event;
comparing, by the computing device, the first badge identification data with the second badge identification data; and
determining, by the computing device, whether the hand hygiene opportunity was a compliant hand hygiene opportunity if the first badge identification data matches the second badge identification data.

* * * * *